(12) United States Patent
Backhus et al.

(10) Patent No.: US 11,645,355 B1
(45) Date of Patent: May 9, 2023

(54) SYSTEMS FOR EVALUATING A PIECEWISE LINEAR FUNCTION

(71) Applicant: Recogni Inc., San Jose, CA (US)

(72) Inventors: Gilles J. C. A. Backhus, Munich (DE); Gary S. Goldman, Los Altos, CA (US)

(73) Assignee: Recogni Inc., San Jose, CA (US)

( * ) Notice: Subject to any disclaimer, the term of this patent is extended or adjusted under 35 U.S.C. 154(b) by 0 days.

(21) Appl. No.: 18/148,673

(22) Filed: Dec. 30, 2022

(51) Int. Cl.
*G06F 17/12* (2006.01)
*G06F 7/544* (2006.01)

(52) U.S. Cl.
CPC ............ *G06F 17/12* (2013.01); *G06F 7/5443* (2013.01)

(58) Field of Classification Search
CPC ............................. G06F 17/12; G06F 17/5443
USPC ......................................................... 708/235
See application file for complete search history.

(56) References Cited

U.S. PATENT DOCUMENTS

| | | | | |
|---|---|---|---|---|
| 8,384,722 | B1 * | 2/2013 | Tremblay | G06T 1/20 345/602 |
| 9,971,540 | B2 | 5/2018 | Herrero Abellanas et al. | |
| 2012/0054254 | A1 * | 3/2012 | Langhammer | G06F 7/548 708/235 |
| 2019/0042922 | A1 | 2/2019 | Pillai et al. | |

OTHER PUBLICATIONS

An; et al., "Piecewise Parabolic Approximate Computation Based on an Error-Flattened Segmenter and a Novel Quantizer", Electronics (2021), 10(21), 2704, pp. 1-19.
Chiluveru; et al., "Accuracy controlled iterative method for efficient sigmoid function approximation", Electronics Letters, Sep. 3, 2020, 56(18):914-916.
Gonzalez-Diaz_Conti; et al., "Hardware-Based Activation Function-Core for Neural Network Implementations", Electronics (2022), 11(1), 14, pp. 1-15.
Hassler; et al., "Function Evaluation by Table Look-up and Addition", Proceedings of the 12th Symposium on Computer Arithmetic, 1995, pp. 10-16, doi: 10.1109/ARITH.1995.465382.
Inturrisi; et al., "Piecewise Linear Units Improve Deep Neural Networks", Cornell University, Aug. 2, 2021, arXiv:2108.00700 [cs.LG], 9 pgs.
Jimenez-Fernandez; et al., "An Iterative Decomposed Piecewise-Linear Model Description", Active and Passive Electronic Components (2009), vol. 2009, Article ID 824531, 5 pages.

(Continued)

*Primary Examiner* — Tan V Mai
(74) *Attorney, Agent, or Firm* — Ascenda Law Group, PC

(57) ABSTRACT

A system for evaluating a piecewise linear function includes a first look-up table with N entries, and a second look-up table with M entries, with M being less than N. Each of the N entries contains parameters that define a corresponding linear segment of the piecewise linear function. The system further includes a controller configured to store a subset of the N entries from the first look-up table in the second look-up table. The system further includes a classifier for receiving an input value and classifying the input value in one of a plurality of segments of a number line. A total number of the segments is equal to M, and the segments are non-overlapping and contiguous. The system further includes a multiplexor for selecting one of the M entries of the second look-up table based on the classification of the input value into one of the plurality of segments.

19 Claims, 22 Drawing Sheets

(56) References Cited

OTHER PUBLICATIONS

Lee; et al., "Hierarchical Segmentation for Hardware Function Evaluation", IEEE Transactions on Very Large Scale Integration (VLSI) Systems, Jan. 2009, 17(1):103-116, doi: 10.1109/TVLSI.2008.2003165.

Sasao; et al., "Application of LUT Cascades to Numerical Function Generators", SASIMI 2004 Proceedings (4-7), ADA596280, 2004, pp. 422-429.

Stine; et al., "The Symmetric Table Addition Method for Accurate Function Approximation", Journal of VLSI Signal Processing (1999), 11:1-12.

Zeng, "A Deep-Network Piecewise Linear Approximation Formula", IEEE Access. 2021, Author Manuscript, 9:120665-120674.

Zhou; et al., "Learning specialized activation functions with the Piecewise Linear Unit", 2021 IEEE/CVF International Conference on Computer Vision (ICCV), Open Access version (2021), pp. 12095-12104.

\* cited by examiner

State of Partial Mapper for First Iteration

State of Partial Mapper for Intermediate Iterations ($3 \leq i \leq N-2$)

*For 1 < i < N*

*For i = N*

US 11,645,355 B1

SYSTEMS FOR EVALUATING A PIECEWISE LINEAR FUNCTION

FIELD OF THE INVENTION

The present invention relates to systems for evaluating a piecewise linear function, and more particularly relates to a hardware architecture for evaluating the piecewise linear function.

BACKGROUND

Modern neural network architectures utilize non-linear activation functions such as the sigmoid function, the hyperbolic tangent function (tanh), the gaussian error linear unit (GELU) function, the exponential linear unit (ELU) function, the scaled exponential linear unit (SELU) function, the rectified linear unit (ReLU) function, etc. In many cases, piecewise linear functions are used to approximate these non-linear activation functions.

SUMMARY OF THE INVENTION

A system designed with the objective of reduced chip area is discussed herein for evaluating piecewise linear functions. In accordance with one embodiment of the invention, a system for evaluating a piecewise linear function PWL(x) at an input value x* may include a first look-up table (LUT) with N entries, and a second LUT with M entries, with M being less than N. Each of the N entries may contain parameters that define a corresponding linear segment of the piecewise linear function. The system may further include a controller configured to load parameters defining one or more of the linear segments from the first LUT into the second LUT. The system may further include a classifier for receiving the input value x* and classifying the input value x* in one of a plurality of segments of a number line. A total number of the segments may be equal to M, and the segments may be non-overlapping and contiguous. The system may further include a multiplexor for selecting one of the M entries of the second LUT based on the classification of the input value x* into one of the plurality of segments. The system may further include a multiplier for multiplying the input value x* with a slope value retrieved from the second LUT to form a product. The system may further include an adder for summing the product with an intercept value retrieved from the second LUT to arrive at an intermediate value. This procedure may be repeatedly iterated after parameters defining other ones of the linear segments are loaded from the first LUT into the second LUT. The system may further include an accumulator to accumulate the intermediate values over a plurality of iterations to arrive at PWL(x) evaluated at the input value x*.

In accordance with one embodiment of the invention, a system for evaluating a piecewise linear function PWL(x) at an input value x* may include a first LUT with N entries, and a second LUT with M entries, with M being less than N. N may be greater than or equal to four and M may be greater than or equal to three. Each of the N entries may contain parameters that define a corresponding linear segment of the piecewise linear function. The system may further include a controller configured to store values in the second LUT that are based on parameters in the first LUT defining one or more of the linear segments. The system may further include a classifier configured to receive an intermediate value and classify the intermediate value in one of a plurality of segments of a number line. A total number of the segments may equal to M, and the segments may be non-overlapping and contiguous. The system may further include a multiplexor for selecting one of the M entries of the second LUT based on the classification of the intermediate value into one of the plurality of segments. The system may further include a multiplier for multiplying the intermediate value with a slope value retrieved from the second LUT to form a product. The system may further include an adder for summing the product with an intercept value retrieved from the second LUT to arrive at a feedback value or the output value PWL(x*). The system may further include a second multiplexor for selecting either the input value x* or the feedback value as the intermediate value. This procedure may be repeatedly iterated after values in the second LUT are updated based on parameters in the first LUT defining one or more of the linear segments.

These and other embodiments of the invention are more fully described in association with the drawings below.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps.

Figure 1:
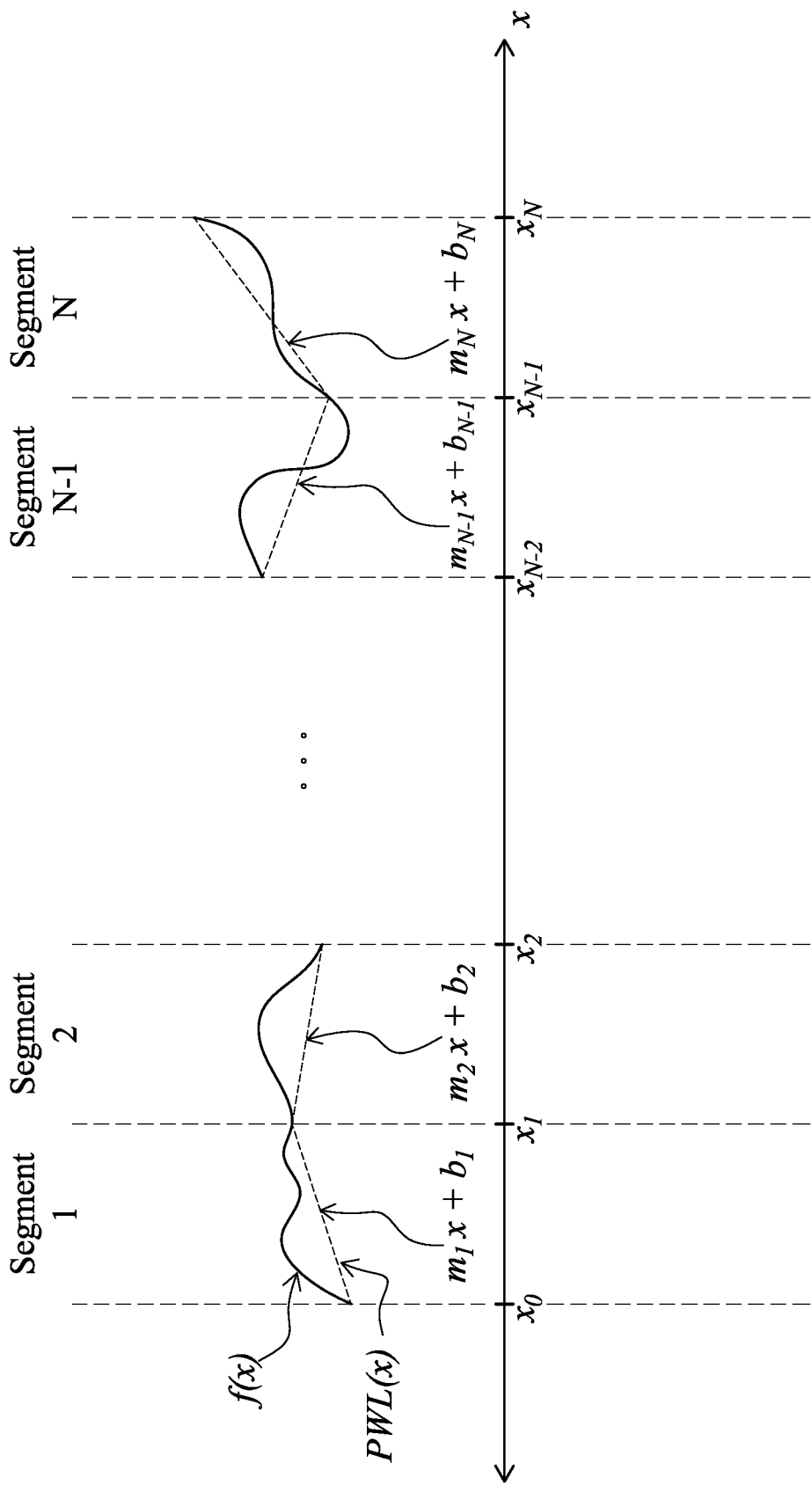
FIG. 1 depicts a plot of a non-linear function $f(x)$ and a piecewise linear function PWL(x) that approximates $f(x)$.

FIG. 1 depicts a plot of a non-linear function $f(x)$ and a piecewise linear function PWL(x) that approximates $f(x)$. PWL(x) may be formed by N linear segments, with each of the segments expressed in the form $m_i x + b_i$ in which i indexes the N linear segments, index $i \in \{1, \ldots, N\}$. Each linear segment may be parameterized by a first x value, $x_{i-1}$ and a second x value $x_i$, with $x_{i-1} < x_i$. The interval $[x_{i-1}, x_i)$ may form the domain of the linear segment. Each linear segment may also be parameterized by a slope $m_i$ and an intercept $b_i$, (e.g., a y-intercept).

More specifically, PWL(x) may be expressed as follows:

$$PWL(x) = \begin{cases} m_1 x + b_1 & \text{for} \quad x_0 \le x < x_1 \\ m_2 x + b_2 & \text{for} \quad x_1 \le x < x_2 \\ \vdots & \vdots \quad \vdots \\ m_{N-1} x + b_{N-1} & \text{for} \quad x_{N-2} \le x < x_{N-1} \\ m_N x + b_N & \text{for} \quad x_{N-1} \le x \le x_N \end{cases}$$

where $$m_i = \frac{f(x_i) - f(x_{i-1})}{x_i - x_{i-1}}$$

$$b_i = \frac{f(x_{i-1}) x_i - f(x_i) x_{i-1}}{x_i - x_{i-1}}$$

for $i \in \{1, \ldots N\}$

PWL(x) may be parameterized by $\{x_j\}$ for $j \in \{0, \ldots N\}$ and $\{m_i, b_i\}$ for $i \in \{1, \ldots N\}$. In one embodiment, $x_0$ is chosen as a very large negative number (or negative infinity) and $x_N$ is chosen as a very large positive number (or positive infinity). In one embodiment, the domain of PWL(x) are x values between $x_0$ and $x_N$, inclusive of the endpoints (i.e., $x \in [x_0, x_N]$).

Figure 2:
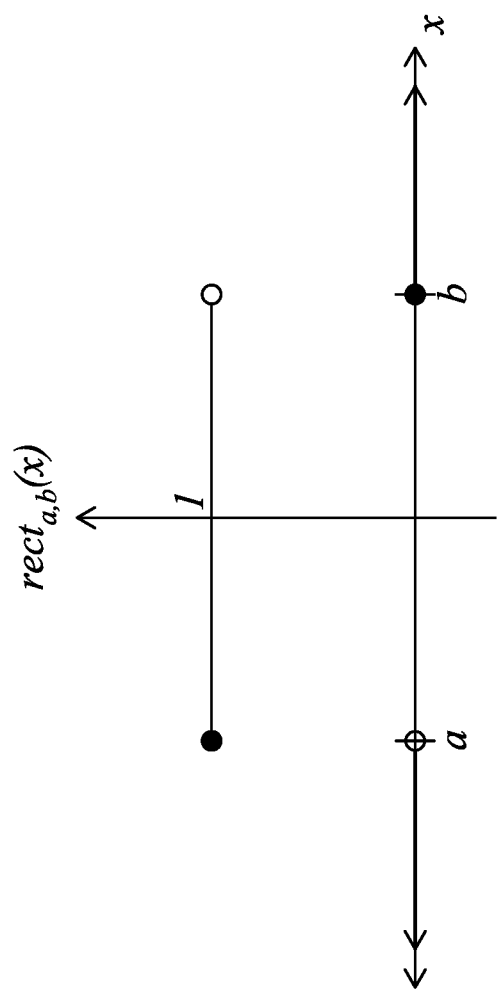
FIG. 2 depicts a plot of a rectangle function $rect_{a,b}(x)$.

FIG. 2 depicts a plot of a rectangle function $rect_{a,b}(x) \cdot rect_{a,b}(x)$ may be parameterized by the two variables a and b, which define the respective locations of the two discontinuities of the rectangle function.

More specifically, $rect_{a,b}(x)$ may be expressed as follows:

$$rect_{a,b}(x) = \begin{cases} 1 & \text{for} \quad a \le x < b \\ 0 & \text{for} \quad x < a, x \ge b \end{cases}$$

Based on the rectangle function, PWL(x) may be rewritten as follows:

$$PWL(x) = \sum_{i=1}^{N} rect_{x_{i-1}, x_i}(x)(m_i x + b_i)$$

To motivate a hardware implementation of the system depicted in FIGS. 3 and 4A-4C to evaluate PWL(x), PWL(x) may further be rewritten as follows:

(Equation 1)
$$PWL(x) = rect_{x_0, x_1}(x)(m_1 x + b_1) +$$
$$rect_{x_1, x_2}(x)(m_2 x + b_2) + \sum_{i=3}^{N-2} rect_{x_{i-1}, x_i}(x)(m_i x + b_i) +$$
$$rect_{x_{N-2}, x_{N-1}}(x)(m_{N-1} x + b_{N-1}) + rect_{x_{N-1}, x_N}(x)(m_N x + b_N)$$

The sum of the first two terms can be computed during a first iteration of an algorithm for evaluating PWL(x) at an input value x*; the third term can be computed during the intermediate iterations of the algorithm; and the sum of the last two terms can be computed during the last iteration of the algorithm. Since the algorithm includes a total of N−2 iterations, the intermediate iterations may more precisely be referred to as the N−4 intermediate iterations, since the intermediate iterations necessarily exclude the first and the last iterations.

Figure 3:
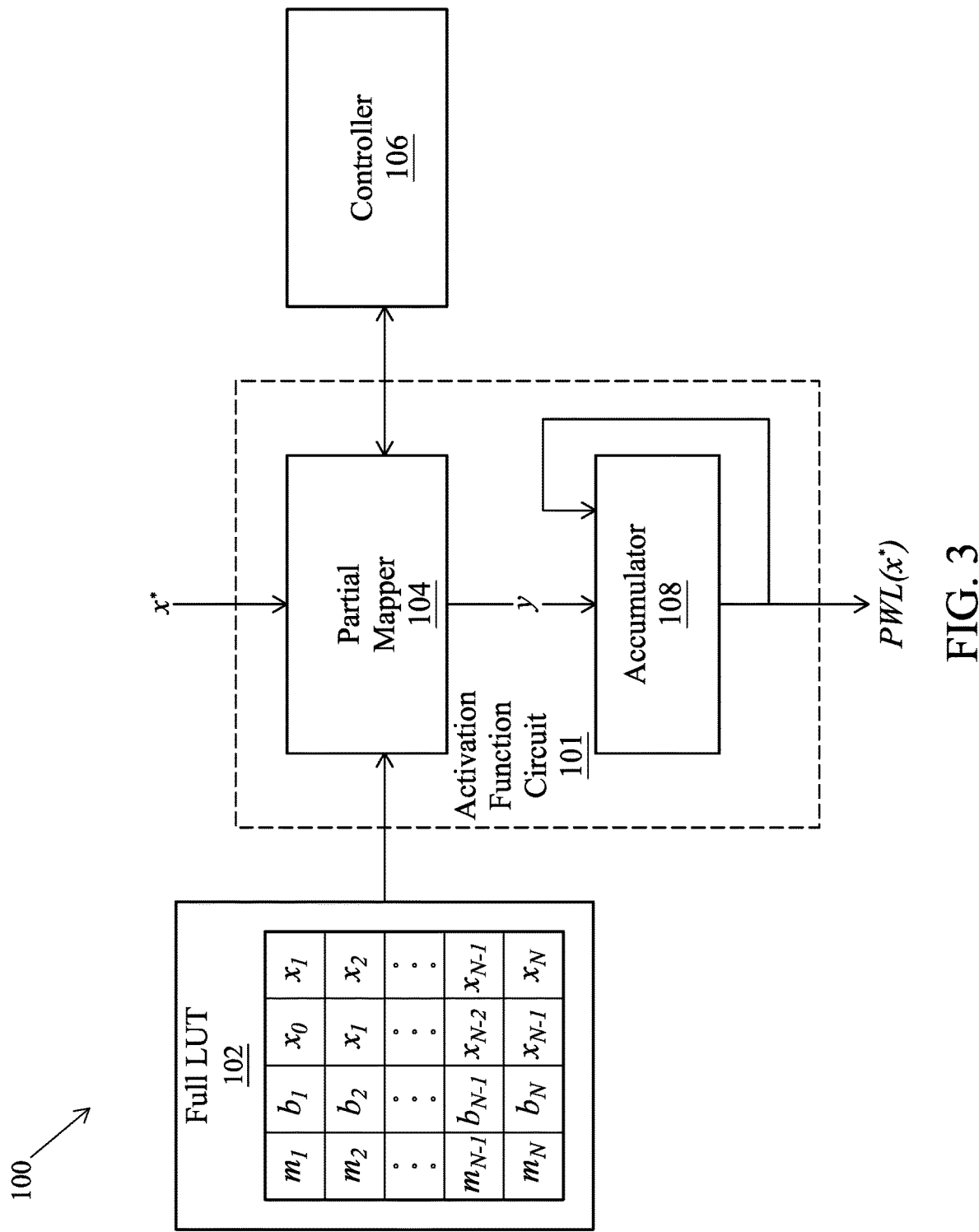
FIG. 3 depicts a system for evaluating the piecewise linear function PWL(x) at an input value x*, in accordance with one embodiment of the present invention.

FIG. 3 depicts a system 100 for evaluating PWL(x) at an input value x*. System 100 may include a full look-up table (LUT) 102 (or more generally, a first LUT) with N rows (or more generally N entries), each row storing parameters that define each of the N linear segments. For example, the first row of full LUT 102 may store $m_1$ (the slope of the first linear segment), $b_1$ (the intercept of the first linear segment) and the pair of x values, $x_0$ & $x_1$, which collectively define the domain of the first linear segment. It is noted that for ease of explanation, some redundancy is present in the example full LUT 102 of FIG. 3, as there are two copies of $x_1$, two copies of $x_2$ and so on. In other embodiments (see, e.g., the full LUT 102 depicted in FIG. 8), the full LUT 102 may omit these duplicate copies and store only the minimum number of parameters necessary to parameterize PWL(x).

Figure 4A:
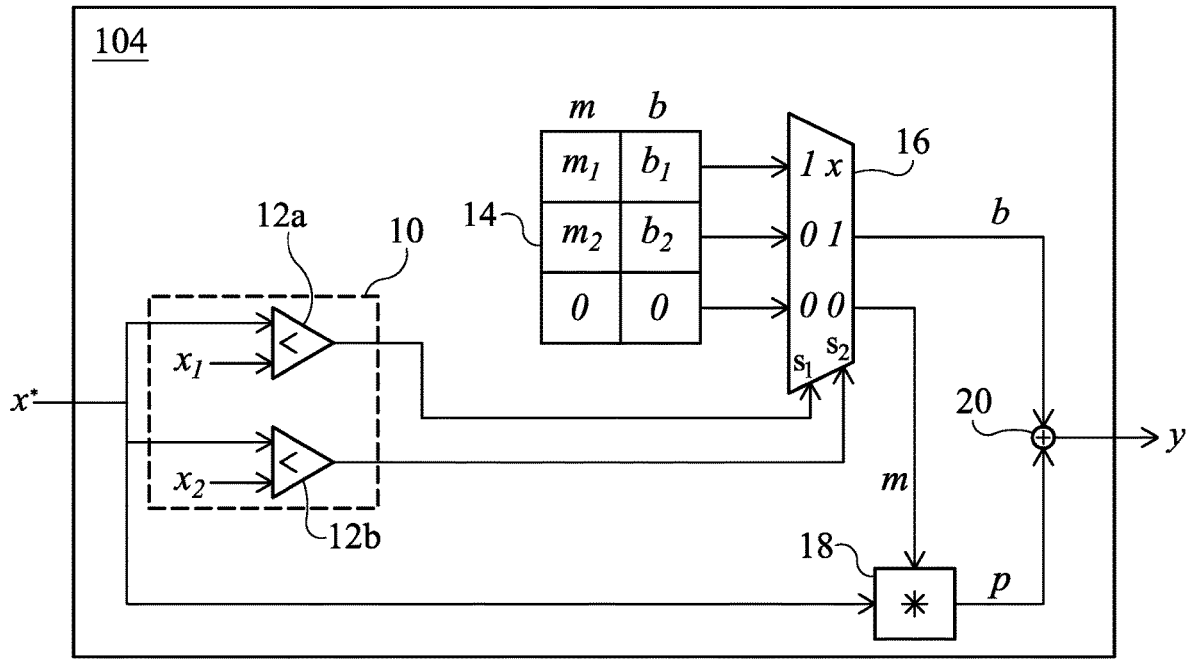
FIGS. 4A-4C depict a logic level schematic of the partial mapper depicted in FIG. 3, and the state of the partial mapper during various iterations of an algorithm for evaluating PWL(x) at an input value x*, in accordance with one embodiment of the present invention.
Figure 4B:
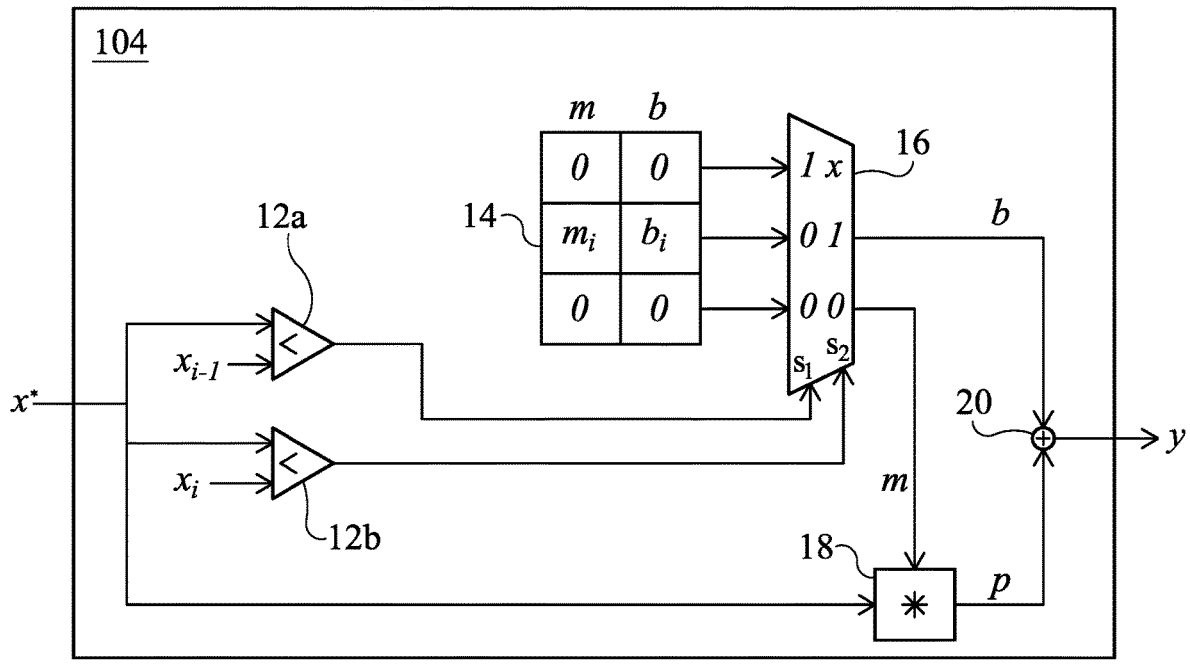
Figure 4C:
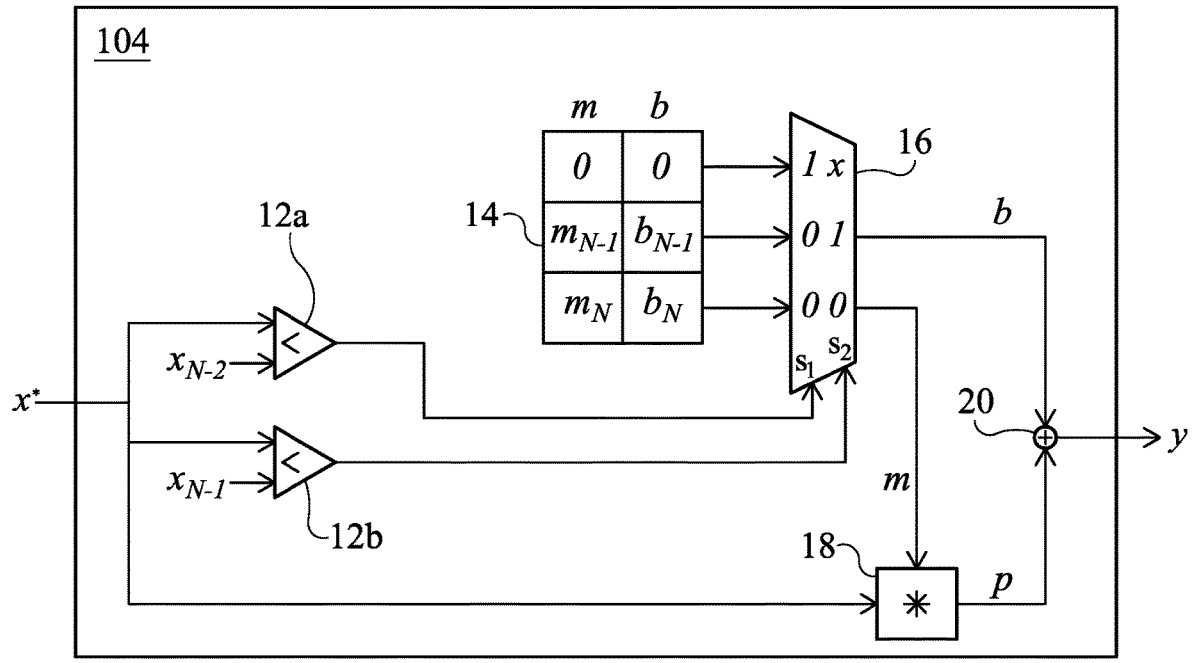

Partial mapper 104 may generate an intermediate value y from the input value x* during each iteration of an algorithm for computing PWL(x*). The particulars of the partial mapper 104 are depicted in FIGS. 4A-4C. As a brief introduction to the operation of the partial mapper 104, controller 106 may be configured to periodically store a subset of the N rows from the full LUT 102 in a partial LUT 14 of partial mapper 104. Accumulator 108 may accumulate the intermediate values y generated over several iterations of the algorithm in order to arrive at PWL(x*). The partial mapper 104 and accumulator 108 may collectively form an activation function circuit 101. For ease of depiction, full LUT 102 is depicted as being directly coupled to the partial mapper 104. However, it should be understood that in a more complete depiction, full LUT 102 may be coupled to partial mapper 104 via controller 106 to more closely match the description of controller 106 being used to periodically store a subset of the N rows from the full LUT 102 in the partial LUT 14 of the partial mapper 104.

FIG. 4A depicts a logic level schematic of the partial mapper 104 depicted in FIG. 3, and the state of the partial mapper 104 during the first iteration of an algorithm for evaluating PWL(x) at an input value x*. At the outset of the first iteration, certain parameters are loaded from the first two rows of the full LUT 102 into the partial mapper 104. These parameters include $x_1$ which is provided to one of the inputs of the comparator 12a, and $x_2$ which is provided to one of the inputs of the comparator 12b. These parameters also include $m_1$, $b_1$ which are loaded from the first row of the full LUT 102 into the first row of the partial LUT 14, and $m_2$, $b_2$ which are loaded from the second row of the full LUT 102 into the second row of the partial LUT 14. After the loading of the parameters, the operation of the partial mapper 104 may proceed as follows.

The classifier 10 may receive input value x* and classify the input value x* in one of a plurality of segments of a number line. The total number of the segments may be equal to M, in which the segments are non-overlapping and contiguous, and partial LUT 14 may have M rows (or entries). Therefore, classifier 10 may be used to select one of the rows (or entries) of the partial LUT 14.

In the example of FIG. 4A, the classifier 10 is configured to classify the input value x* into one of three segments of a number line. The classifier 10 may be implemented using two comparators 12a, 12b. Comparator 12a may determine whether the input value x* is less than $x_1$, and comparator 12b may determine whether the input value x* is less than $x_2$. By the definition of PWL(x), $x_1 < x_2$, so the output of the comparator 12a being equal to logical 1 or TRUE indicates that the input value x* has been classified into a first segment of the number line with values less than $x_1$; the output of the comparator 12b being equal to logical 1 or TRUE indicates that the input value x* has been classified into a second segment of the number line with values greater than or equal to $x_1$ but less than $x_2$; and the output of both comparators 12a, 12b being equal to logical 0 or FALSE indicates that the that the input value x* has been classified into a third segment of the number line with values greater than or equal to $x_2$.

The respective outputs of the comparators 12a, 12b may be used as selector signals of a multiplexor 16. In the example of FIG. 4A, the output of the comparators 12a, 12b are connected to selectors $s_1$, $s_2$, respectively. Selector $s_1$ receiving logical 1 causes the multiplexor 16 to output the first row of the partial LUT 14; selector $s_2$ receiving logical 1 causes the multiplexor 16 to output the second row of the partial LUT 14; and selectors $s_1$ and $s_2$ both receiving logical 0 causes the multiplexor 16 to output the third row of the partial LUT 14.

The multiplier 18 may be configured to multiply the input value x* with a slope value, m, retrieved from the partial LUT 14 to form a product, p. The adder 20 is configured to sum the product, p, with an intercept value, b, retrieved from the partial LUT 14. The output of the adder 20 may be output from the partial mapper 104 as the previously discussed intermediate value y. To connect back with the earlier discussion, intermediate value y is set equal to $\text{rect}_{x_0, x_1}(x^*)(m_1 x^* + b_1) + \text{rect}_{x_1, x_2}(x^*)(m_2 x^* + b_2)$ during the first iteration depicted in FIG. 4A.

FIG. 4B depicts the state of the partial mapper 104 during any one of the N-4 intermediate iterations of the algorithm for evaluating PWL(x) at an input value x*. At the outset of one of these intermediate iteration, certain parameters are loaded from the full LUT 102 into the partial mapper 104. These parameters include $x_{i-1}$ which is provided to one of the inputs of the comparator 12a, and $x_i$ which is provided to one of the inputs of the comparator 12b. These parameters also include $m_i$, $b_i$ which are loaded from the full LUT 102 into the second row of the partial LUT 14. i equals 3 for the second iteration and equals N-2 for the (N-3)$^{th}$ iteration. Therefore, $i \in \{3, \ldots, N-2\}$. For any one of the intermediate iterations, the first and last rows of the partial LUT 14 may be set to zero values. There is no change to the operation of the partial mapper 104 in FIG. 4B other than the configuration of the parameter values; therefore, the operation of the partial mapper 104 in FIG. 4B will not be explained in detail. To connect back with the earlier discussion, intermediate value y is set equal to $\text{rect}_{x_{i-1}, x_i}(x^*)(m_i x^* + b_i)$ during each of the intermediate iterations depicted FIG. 4B for $i \in \{3, \ldots, N-2\}$.

FIG. 4C depicts the state of the partial mapper 104 during the last iteration of an algorithm for evaluating PWL(x) at an input value x*. At the outset of the last iteration, certain parameters are loaded from the full LUT 102 into the partial mapper 104. These parameters include $x_{N-2}$ which is loaded into one of the inputs of the comparator 12a, and $x_{N-1}$ which is loaded into one of the inputs of the comparator 12b. These parameters also include $m_{N-1}$, $b_{N-1}$ which are loaded from the full LUT 102 into the second row of the partial LUT 14, and $m_N$, $b_N$ which are loaded from the full LUT 102 into the third row of the partial LUT 14. The first row of the partial LUT 14 may be set to zero values. There is no change to the operation of the partial mapper 104 in FIG. 4C other than the configuration of the parameter values; therefore, the operation of the partial mapper 104 in FIG. 4C will not be explained in detail. To connect back with the earlier discussion, intermediate value y is set equal to $\text{rect}_{x_{N-2}, x_{N-1}}(x^*)(m_{N-1} x^* + b_{N-1}) + \text{rect}_{x_{N-1}, x_N}(x^*)(m_N x^* + b_N)$ during the last iteration depicted in FIG. 4C. It should be apparent that the accumulation of these intermediate values y yields PWL(x*) based on the earlier presented decomposition of PWL(x) in Equation 1.

Some motivation is now provided for system 100. In a typical implementation, system 100 includes one copy of full LUT 102, one controller 106, but many instances of activation function circuit 101 (i.e., one for each convolver unit of a convolver array). As chip area is a limiting resource on an application specific integrated circuit (ASIC), it is desired to reduce the number of hardware components of the activation function circuit 101. The present design effectively trades off computational efficiency for a reduced hardware complexity implementation of the activation function circuit 101. While it would certainly be possible to evaluate PWL(x*) in a single iteration, such a design would require a much more complex classifier that is capable of performing an N-way classification. Rather than such hardware intensive design, the present activation function circuit 101 only requires two comparators 12a, 12b for classifying the input value x* into one out of three segments.

Figure 5A:
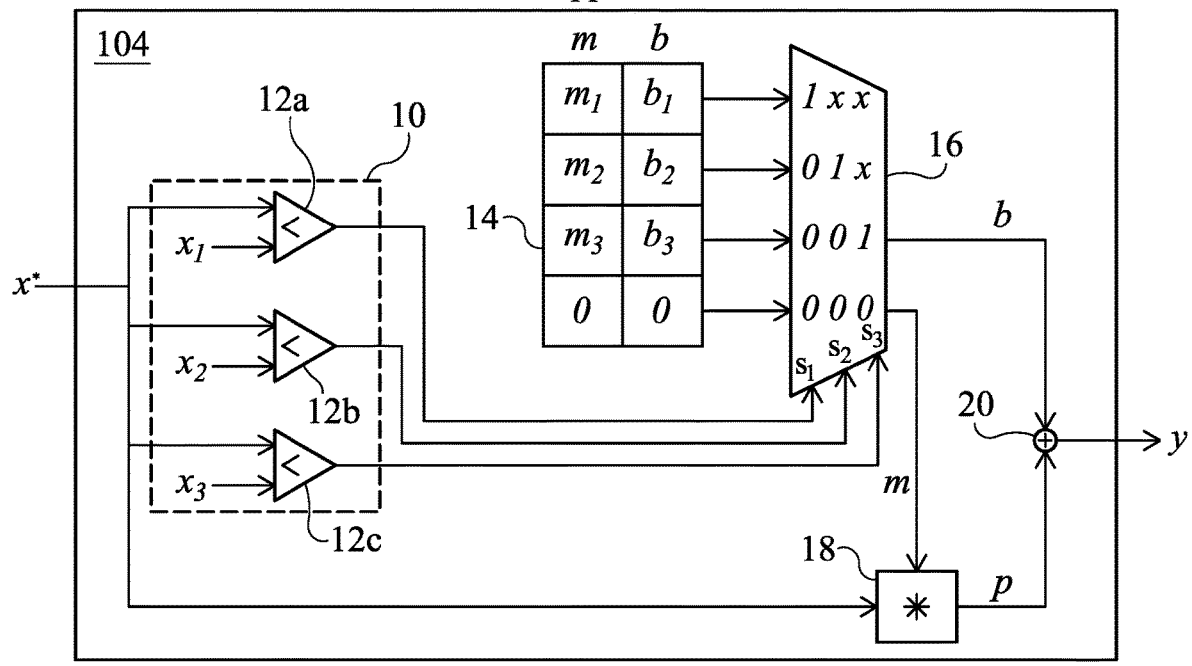
FIGS. 5A-5C depict a variation of FIGS. 4A-4C in which the classifier of the partial mapper classifies the input value x* into a greater number of segments than the classifier of FIGS. 4A-4C, in accordance with one embodiment of the present invention.
Figure 5B:
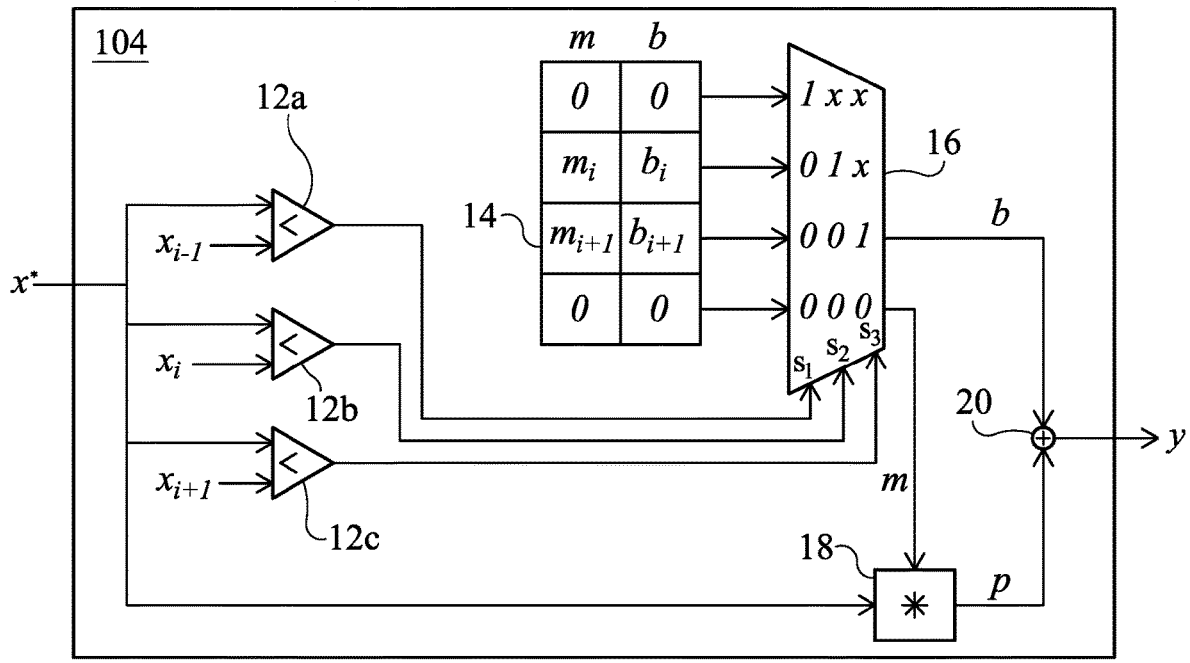
Figure 5C:
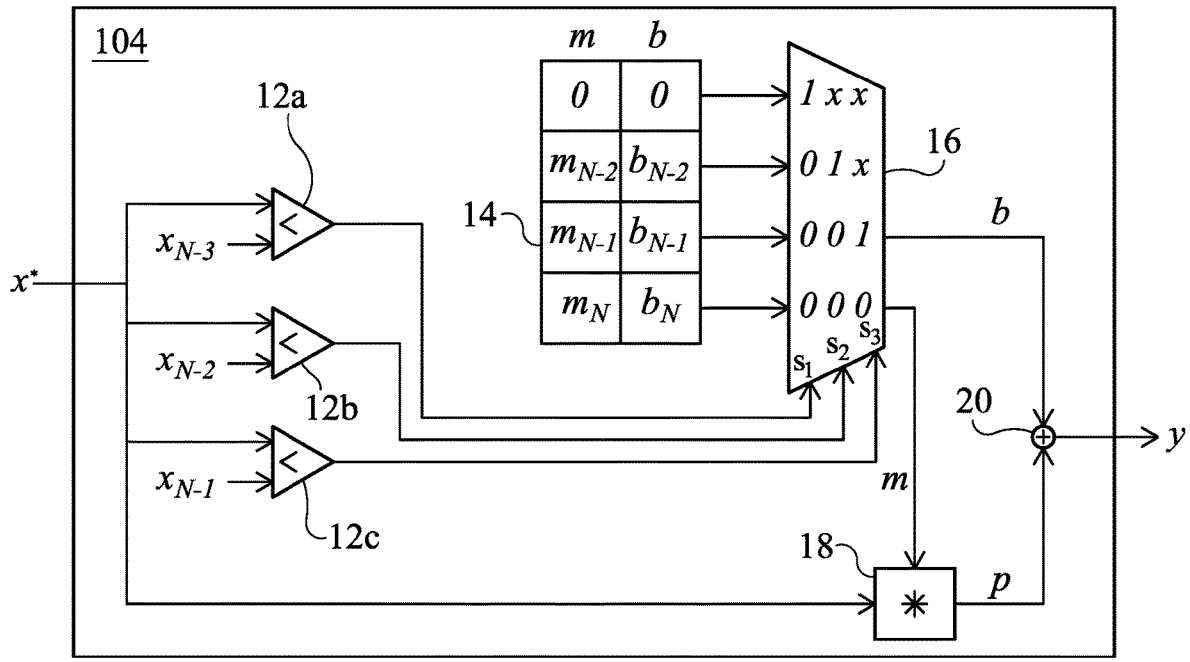

The following discussion in FIGS. 5A-5C concerns a design that seeks to take a more "middle ground" approach (increasing the computational efficiency by a certain degree at the expense of increased hardware complexity). The partial mapper 104 depicted in FIGS. 5A-5C includes three comparators 12a, 12b, 12c instead of the two comparators 12a, 12b in FIGS. 4A-4C, allowing the partial mapper 104 to evaluate more linear segments of the piecewise linear function PWL(x) during each iteration.

To motivate the discussion in FIGS. 5A-5C, PWL(x) can further be rewritten as follows:

$$PWL(x) = rect_{x_0, x_1}(x)(m_1 x + b_1) + \qquad \text{(Equation 2)}$$
$$rect_{x_1, x_2}(x)(m_2 x + b_2) + rect_{x_2, x_3}(x)(m_3 x + b_3) +$$
$$\sum_{i=4}^{N-3} rect_{x_{i-1}, x_i}(x)(m_i x + b_i) + rect_{x_{N-3}, x_{N-2}}(x)(m_{N-2} x + b_{N-2}) +$$
$$rect_{x_{N-2}, x_{N-1}}(x)(m_{N-1} x + b_{N-1}) + rect_{x_{N-1}, x_N}(x)(m_N x + b_N)$$

The sum of the first three terms can be computed during a first iteration of an alternative algorithm for evaluating PWL(x) at an input value x*, the fourth term can be computed during the intermediate iterations of the algorithm, and the sum of the last three terms can be computed during the last iteration of the algorithm. Since the alternative algorithm includes a total of N/2−1 iterations (assuming that N is an even number for the ease of explanation), these intermediate iterations may more precisely be referred to as the N/2−3 intermediate iterations, since the intermediate iterations necessarily exclude the first and the last iterations.

FIG. 5A depicts an alternative logic level schematic of the partial mapper 104 depicted in FIG. 3, and the state of the partial mapper 104 during the first iteration of the alternative algorithm for evaluating PWL(x) at an input value x*. At the outset of the first iteration, certain parameters are loaded from the first three rows of the full LUT 102 into the partial mapper 104. These parameters include $x_1$ which is loaded into one of the inputs of the comparator 12a, $x_2$ which is loaded into one of the inputs of the comparator 12b, and $x_3$ which is loaded into one of the inputs of the comparator 12c. These parameters also include $m_1$, $b_1$ which are loaded from the first row of the full LUT 102 into the first row of the partial LUT 14; $m_2$, $b_2$ which are loaded from the second row of the full LUT 102 into the second row of the partial LUT 14; and $m_3$, $b_3$ which are loaded from the third row of the full LUT 102 into the third row of the partial LUT 14. The fourth row of the partial LUT 14 may be populated with zeros.

In the example of FIG. 5A, the classifier 10 is configured to classify the input value x* into one of four segments of a number line. The classifier 10 may be implemented using three comparators 12a, 12b, 12c. Comparator 12a may determine whether the input value x* is less than $x_1$; comparator 12b may determine whether the input value x* is less than $x_2$; and comparator 12c may determine whether the input value x* is less than $x_3$. By the definition of PWL(x), $x_1 < x_2 < x_3$, so the output of the comparator 12a being equal to logical 1 or TRUE indicates that the input value x* has been classified into a first segment of the number line with values less than $x_1$; the output of the comparator 12b being equal to logical 1 or TRUE indicates that the input value x* has been classified into a second segment of the number line with values greater than or equal to $x_1$ but less than $x_2$; the output of the comparator 12c being equal to logical 1 or TRUE indicates that the input value x* has been classified into a third segment of the number line with values greater than or equal to $x_2$ but less than $x_3$; and the output of all the comparators 12a, 12b, 12c being equal to logical 0 or FALSE indicates that the input value x* has been classified into a fourth segment of the number line with values greater than or equal to $x_3$.

The respective outputs of the comparators 12a, 12b, 12c may be used as selector inputs of a multiplexor 16. In the example of FIG. 5A, the outputs of comparator 12a, 12b, 12c are connected to selectors $s_1$, $s_2$, $s_3$, respectively. Selector $s_1$ receiving logical 1 causes the multiplexor 16 to output the first row of the partial LUT 14; selector $s_2$ receiving logical 1 causes the multiplexor 16 to output the second row of the partial LUT 14; selector $s_3$ receiving logical 1 causes the multiplexor 16 to output the third row of the partial LUT 14; and selectors $s_1$, $s_2$, $s_3$ all receiving logical 0 cause the multiplexor 16 to output the fourth row of the partial LUT 14.

The multiplier 18 may be configured to multiply the input value x* with a slope value, m, retrieved from the partial LUT 14 to form a product, p. The adder 20 is configured to sum the product, p, with an intercept value, b, retrieved from the partial LUT 14. The output of the adder 20 may be output from the partial mapper 104 as the previously discussed intermediate value y. To connect back with the earlier discussion, intermediate value y is set equal to $rect_{x_0, x_1}(x^*)(m_1 x^* + b_1) + rect_{x_1, x_2}(x^*)(m_2 x^* + b_2) + rect_{x_2, x_3}(x^*)(m_3 x^* + b_3)$ during the first iteration depicted in FIG. 5A.

FIG. 5B depicts the state of the partial mapper 104 during any one of the N/2−3 intermediate iterations of the alternative algorithm for evaluating PWL(x) at an input value x*. At the outset of any one of these intermediate iteration, certain parameters are loaded from the full LUT 102 into the partial mapper 104. These parameters include $x_{i-1}$ which is loaded into one of the inputs of the comparator 12a; $x_i$ which is loaded into one of the inputs of the comparator 12b; and $x_{i+1}$ which is loaded into one of the inputs of the comparator 12c. These parameters also include $m_i$, $b_i$ which are loaded from the full LUT 102 into the second row of the partial LUT 14; and $m_{i+1}$, $b_{i+1}$ which are loaded from the full LUT 102 into the third row of the partial LUT 14. i equals 4 for the second iteration and equals N−4 for the $(N/2-3)^{th}$ iteration. Further, i increments by 2 during the intermediate iterations. Therefore, $i \in \{4, 6, \ldots N-6, N-4\}$. For any one of the intermediate iterations, the first and last rows of the partial LUT 14 may be set to zero values. There is no change to the operation of the partial mapper 104 in FIG. 5B other than the configuration of the parameter values; therefore, the operation of the partial mapper 104 in FIG. 5B will not be explained in detail. To connect back with the earlier discussion, intermediate value y is set equal to $rect_{x_{i-1}, x_i}(x^*)(m_i x^* + b_i) + rect_{x_i, x_{i+1}}(x^*)(m_{i+1} x^* + b_{i+1})$ during each of the intermediate iterations depicted FIG. 5B for $i \in \{4, 6, \ldots N-6, N-4\}$.

FIG. 5C depicts the state of the partial mapper 104 during the last iteration of the alternative algorithm for evaluating PWL(x) at an input value x*. At the outset of the last iteration, certain parameters are loaded from the full LUT 102 into the partial mapper 104. These parameters include $x_{N-3}$ which is loaded into one of the inputs of the comparator 12a; $x_{N-2}$ which is loaded into one of the inputs of the comparator 12b; and $x_{N-1}$, which is loaded into one of the inputs of the comparator 12c. These parameters also include $m_{N-2}$, $b_{N-2}$ which are loaded from the full LUT 102 into the second row of the partial LUT 14; $m_{N-1}$, $b_{N-1}$, which are loaded from the full LUT 102 into the third row of the partial LUT 14; $m_N$, $b_N$ which are loaded from the full LUT 102 into the fourth row of the partial LUT 14. The first row of the partial LUT 14 may be set to zero values. There is no change to the operation of the partial mapper 104 in FIG. 5C other than the configuration of the parameter values; therefore, the operation of the partial mapper 104 in FIG. 5C will not be explained in detail. To connect back with the earlier discussion, intermediate value y is set equal to $rect_{x_{N-3}, x_{N-2}}(x^*)$ $(m_{N-2}x^*+b_{N-2})$+rect$_{x_{N-2},x_{N-1}}(x^*)(m_{N-1}x^*+b_{N-1})$+rect$_{x_{N-1},x_N}$ $(x^*)(m_N x^*+b_N)$ during the last iteration depicted in FIG. 5C. It should be apparent that the accumulation of these intermediate values y yields PWL(x*) based on the earlier presented decomposition of PWL(x) in Equation 2.

To note, in the alternative embodiment of the partial mapper 104, the number of rows (or entries) of the partial LUT 14 has increased from three to four. It is understood that further modification could arrive at designs with an even higher number of rows (or entries) of the partial LUT 14. However, the partial LUT 14 must have a number of rows (or entries) that is less than N, the total number of rows of the full LUT 102. Otherwise, the partial LUT 14 would no longer be "partial," and the partial mapper 104 would no longer have a reduced hardware complexity.

Figure 6:
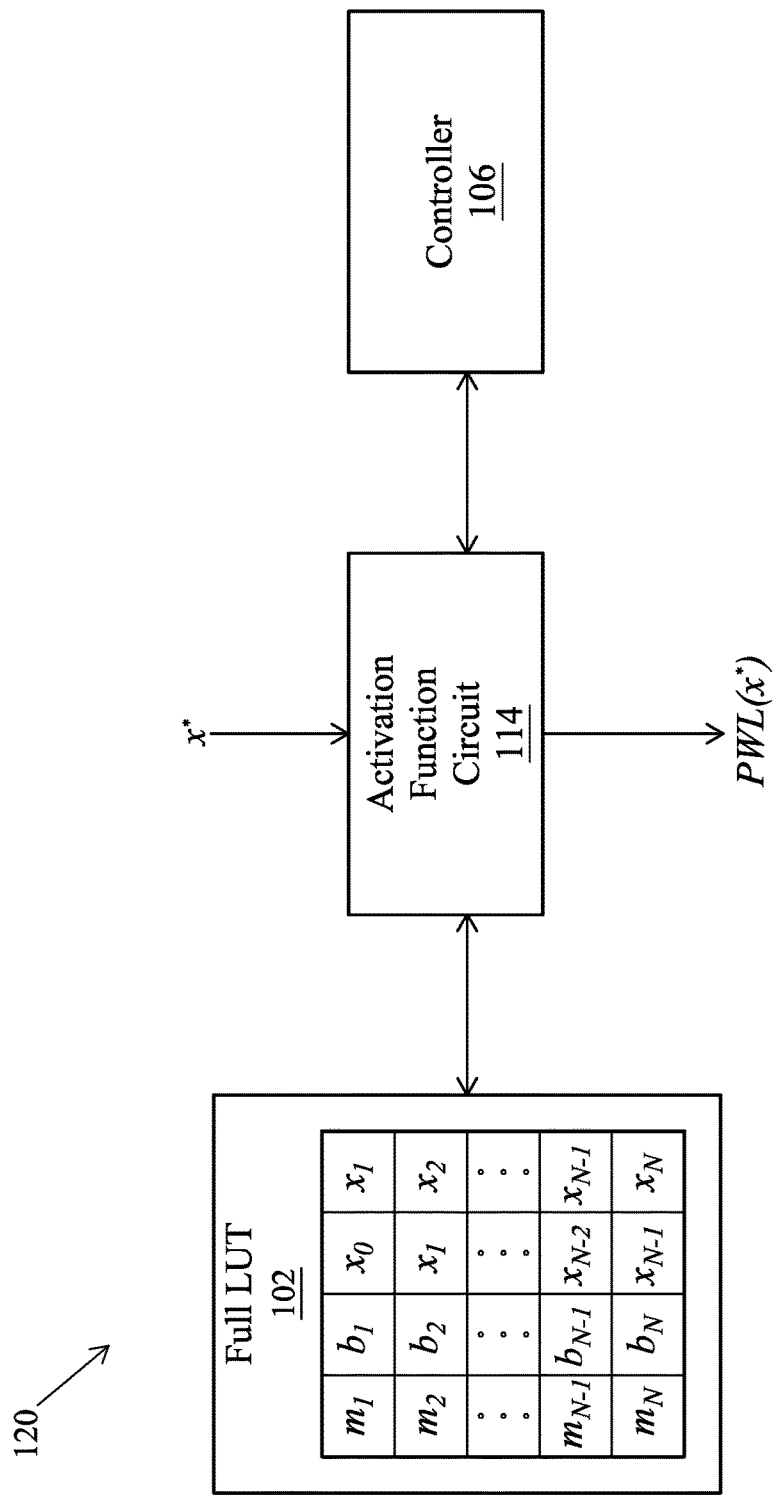
FIG. 6 depicts a system for evaluating the piecewise linear function PWL(x) at an input value x*, in accordance with one embodiment of the present invention.

FIG. 6 depicts a system 120 for evaluating PWL(x) at an input value x*. In contrast to the previously described activation function circuits, activation function circuit 114 is not formed by a partial mapper and an accumulator. The function of controller 106 and full LUT 102 are similar in that the controller 106 periodically loads one or more rows of the full LUT 102 into a partial LUT 14 of the activation function circuit 114. Again, for ease of depiction, full LUT 102 is depicted as being directly coupled to the activation function circuit 114. However, it should be understood that in a more complete depiction, full LUT 102 may be coupled to the activation function circuit 114 via controller 106 to more closely match the description of controller 106 being used to periodically load one or more rows of the full LUT 102 into the partial LUT 14 of the activation function circuit 114. The details of activation function circuit 114 are now explained with respect to FIGS. 7A-7B.

Figure 7A:
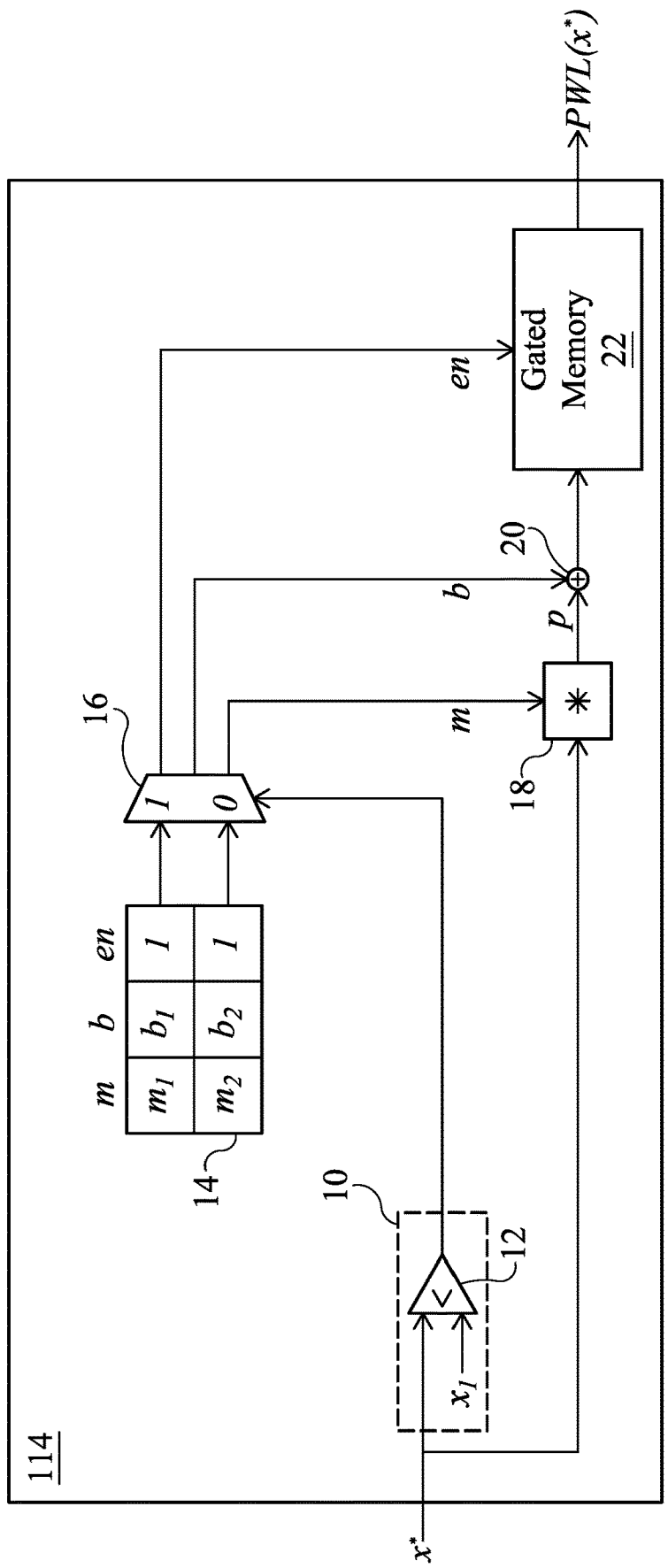
FIGS. 7A-7B depict a logic level schematic of the activation function circuit depicted in FIG. 6, and the state of the activation function circuit during various iterations of an algorithm for evaluating PWL(x) at an input value x*, in accordance with one embodiment of the present invention.

FIG. 7A depicts a logic level schematic of the activation function circuit 114 depicted in FIG. 6, and the state of the activation function circuit 114 during the first iteration of an algorithm for evaluating PWL(x) at an input value x*. At the outset of the first iteration, certain parameters are loaded from the first two rows of the full LUT 102 into the activation function circuit 114. These parameters include $x_1$ which is loaded into one of the inputs of the comparator 12. These parameters also include $m_1$, $b_1$ which are loaded from the first row of the full LUT 102 into the first row of the partial LUT 14, and $m_2$, $b_2$ which are loaded from the second row of the full LUT 102 into the second row of the partial LUT 14. It is noted that each of the M entries of the partial LUT 14 further includes an enable signal for either enabling or disabling a storing operation associated with a gated memory 22. In the case of the first iteration, the enable signal is enabled for both rows of the partial LUT 14. After the loading of the parameters, the operation of the activation function circuit 114 may proceed as follows.

The classifier 10 (implemented with a single comparator 12) determines whether the input value x* is less than $x_1$. If so, the input value x* is mapped to an output value using the function of the first linear segment (i.e., $m_1 x+b_1$). Specifically, such mapping is carried out by passing the logical 1 signal from the output of the comparator 12 to the selector input of the multiplexor 16, retrieving the slope value $m_1$, intercept value $b_1$, and enable value 1, from the partial LUT 14, computing the product p of $m_1$ and x* using the multiplier 18, computing the sum of the product p and the intercept $b_1$ using the adder 20, and storing the resulting sum in a gated memory 22 while the enable signal, en, is asserted (i.e., is equal to logical 1).

If, however, the classifier 10 determines that the input value x* is not less than $x_1$, the activation function circuit 114 prospectively maps the input value x* to an output value using the function of the second linear segment (i.e., $m_2 x+b_2$). Specifically, such mapping is carried out by passing the logical 0 signal from the output of the comparator 12 to the selector input of the multiplexor 16, retrieving the slope $m_2$, intercept $b_2$, and enable value 1, from the partial LUT 14, computing the product p of $m_2$ and x* using the multiplier 18, computing the sum of the product p with the intercept $b_2$ using the adder 20, and storing the resulting sum in the gated memory 22 while the enable signal, en, is asserted (i.e., is equal to logical 1). The term "prospectively" is used because such mapping may or may not be correct. Subsequent operations will either confirm that this mapping is correct, and leave the sum stored in the gated memory 22 unchanged, or will determine that this mapping is incorrect, and overwrite the sum stored in the gated memory 22.

Figure 7B:
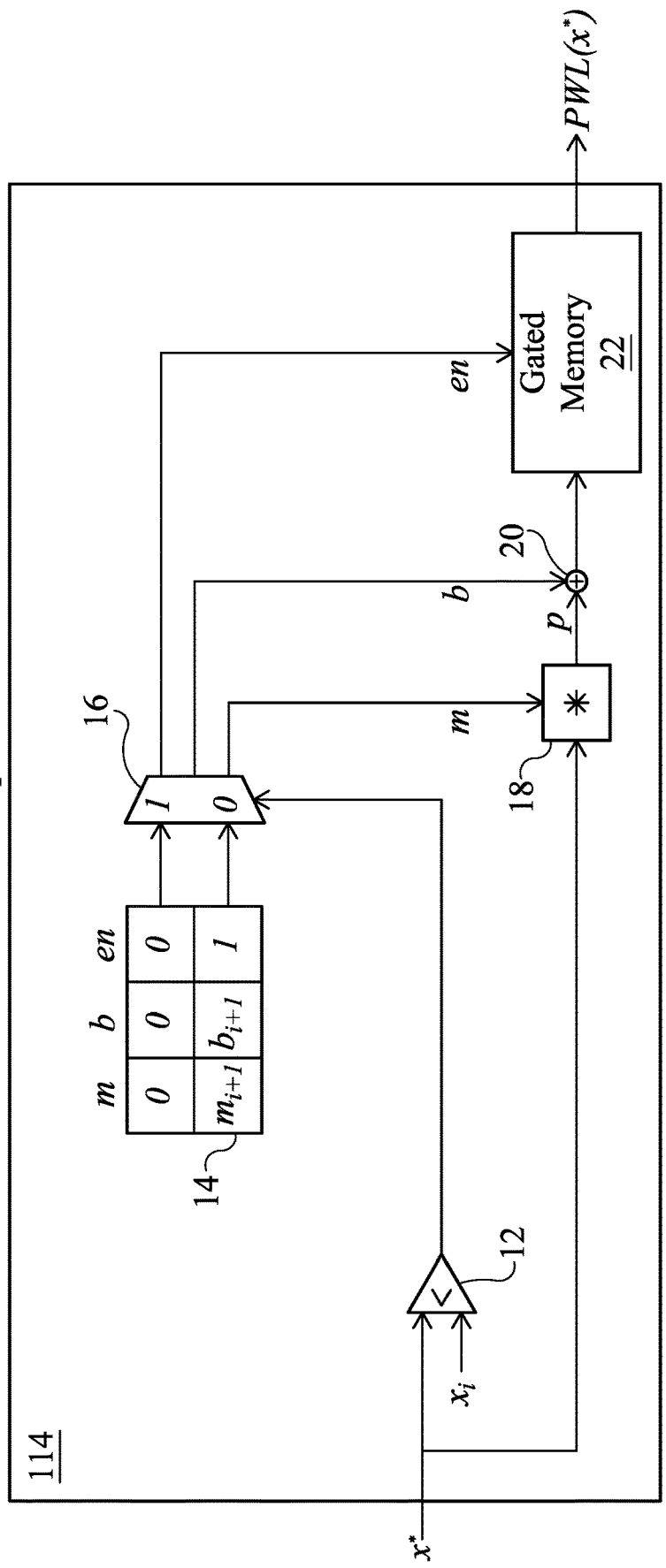

FIG. 7B depicts the state of the activation function circuit 114 during subsequent iterations of an algorithm for evaluating PWL(x) at an input value x*. At the outset of any one of the subsequent iterations, certain parameters are loaded from the full LUT 102 into the activation function circuit 114. These parameters include $x_i$ which is loaded into one of the inputs of the comparator 12. These parameters also include $m_{i+1}$, $b_{i+1}$ which are loaded from the full LUT 102 into the second row of the partial LUT 14. In the case of the intermediate iterations, the enable signal is disabled for the first row of the partial LUT 14, and is enabled for the second row of the partial LUT 14. After the loading of the parameters, the operation of the activation function circuit 114 may proceed as follows.

The classifier 10 (implemented with a single comparator 12) determines whether the input value x* is less than $x_i$. If so, this means that the input value has already been mapped to an output value, and the output value stored in the gated memory 22 is correct. As such, no updating of the gated memory 22 is performed (i.e., the enable signal is set to 0).

If the input value x* is not less than $x_i$, the activation function circuit 114 again prospectively maps the input value x* to an output value, this time using the function of the $(i+1)^{th}$ linear segment (i.e., $m_{i+1}x+b_{i+1}$). Specifically, such mapping is carried out by passing the logical 0 signal from the output of the comparator 12 to the selector input of the multiplexor 16, retrieving the slope $m_{i+1}$, intercept $b_{i+1}$, and enable value 1, from the partial LUT 14, computing the product p of $m_{i+1}$ and x* using the multiplier 18, computing the sum of the product p and the intercept $b_{i+1}$ using the adder 20, and storing the resulting sum in the gated memory 22 while the enable signal, en, is asserted (i.e., is equal to logical 1).

The mapping is not prospective for i=N−1, since a logical zero output of the comparator 12 would indicate (with certainty) that the input value x* belongs to linear segment N (under the assumption that $x_N$ is set to positive infinity), and PWL(x*) is computed by $m_N x^*+b_N$.

As may be apparent, the gated memory 22 essentially takes the place of the accumulator 108 of the previous embodiments in system 100, so there is not much difference in terms of hardware complexity due to the absence of accumulator 108. However, there is some reduced hardware complexity due to the use of only a single comparator 12 and a multiplexor 16 with only one selector signal, as well as a partial LUT 14 with only two rows.

Figure 8:
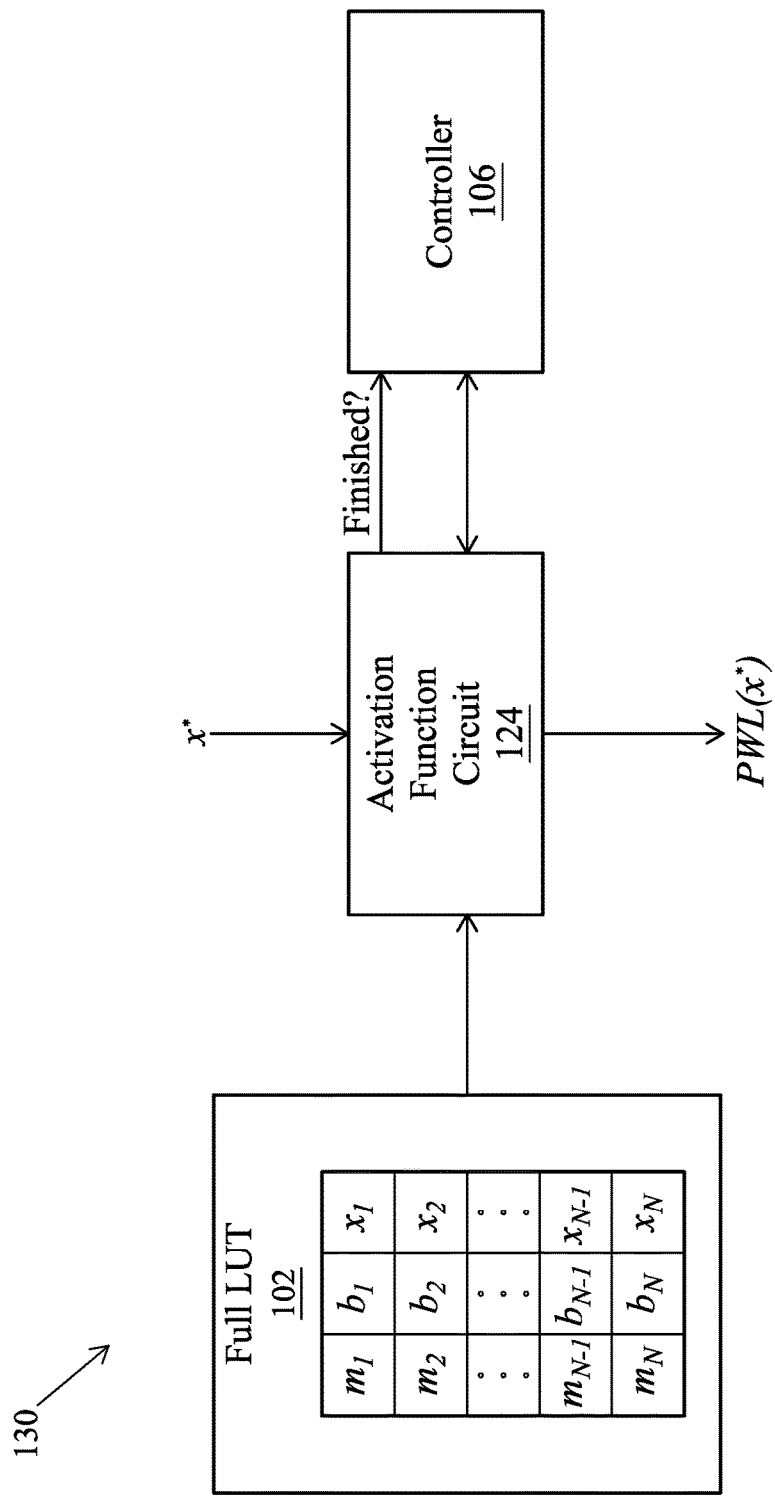
FIG. 8 depicts a system for evaluating the piecewise linear function PWL(x) at an input value x*, in accordance with one embodiment of the present invention.

FIG. 8 depicts a system 130 for evaluating the piecewise linear function PWL(x) at an input value x*. In contrast to the activation function circuit 114 depicted in FIG. 6, activation function circuit 124 transmits a signal indicating the termination of the algorithm to the controller 106 (i.e., the "finished?" signal), at which point PWL(x*) may be read from the output of the activation function circuit 124. The contents of the full LUT 102 may also be stored in a more compact manner, as each row only stores a single $x_i$ value without any redundant storing of the $x_i$ values. The details of activation function circuit 124 are now explained with respect to FIG. 9.

Figure 9:
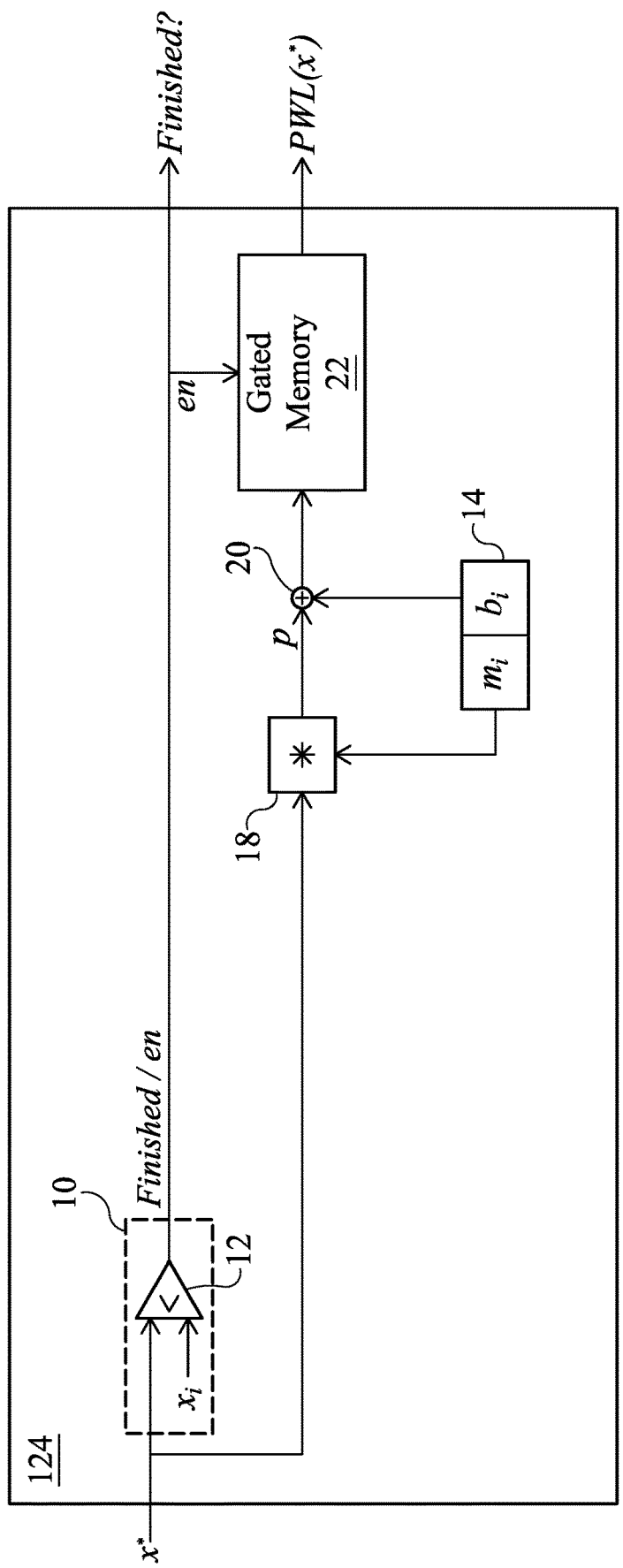
FIG. 9 depicts a logic level schematic of the activation function circuit depicted in FIG. 8, and the state of the activation function circuit during various iterations of an algorithm for evaluating PWL(x) at an input value x*, in accordance with one embodiment of the present invention.

FIG. 9 depicts a logic level schematic of the activation function circuit 124 depicted in FIG. 8, and the state of the activation function circuit 124 during each iteration of an algorithm for evaluating PWL(x) at an input value x*. The algorithm is initialized by setting the index i equal to 1. At the outset of each iteration, certain parameters are loaded from one row of the full LUT 102 into the activation function circuit 124. These parameters include $x_i$ which is loaded into one of the inputs of the comparator 12. These parameters also include $m_i$, $b_i$ which are loaded from the full LUT 102 into the partial LUT 14. After the loading of the parameters, the operation of the activation function circuit 124 may proceed as follows.

The classifier 10 (implemented with a single comparator 12) determines whether the input value x* is less than $x_i$. If so, the finished and enable signals (i.e., "enable" abbreviated as "en" in FIG. 9) are asserted or set to logical 1. At the same time the comparison is carried out, the input value x* is transformed by the function of the $i^{th}$ linear segment by using multiplier 18 to multiply $m_i$ and x* to generate the product p and using the adder 20 to compute the sum of the product p with the intercept $b_i$. If the enable signal is asserted, the sum is stored in the gated memory 22 and the algorithm concludes. If the enable signal is not asserted, the index i is incremented, and the algorithm is repeated for the next linear segment (i.e., by loading new parameters from one row of the full LUT 102 into the activation function circuit 124, and computing $m_i x^* + b_i$). The algorithm is repeated in a similar manner until either the index i is set equal to N+1 or the finished signal is asserted (whichever occurs first).

To compare, activation function circuit 124 is more frugal in its hardware architecture than activation function circuit 114 in that it does not contain multiplexor 16, and further its partial LUT 14 only includes a single row. However, such efficiencies in the design are offset by the additional complexity associated with communicating the finished signal to the controller 106.

Figure 12:
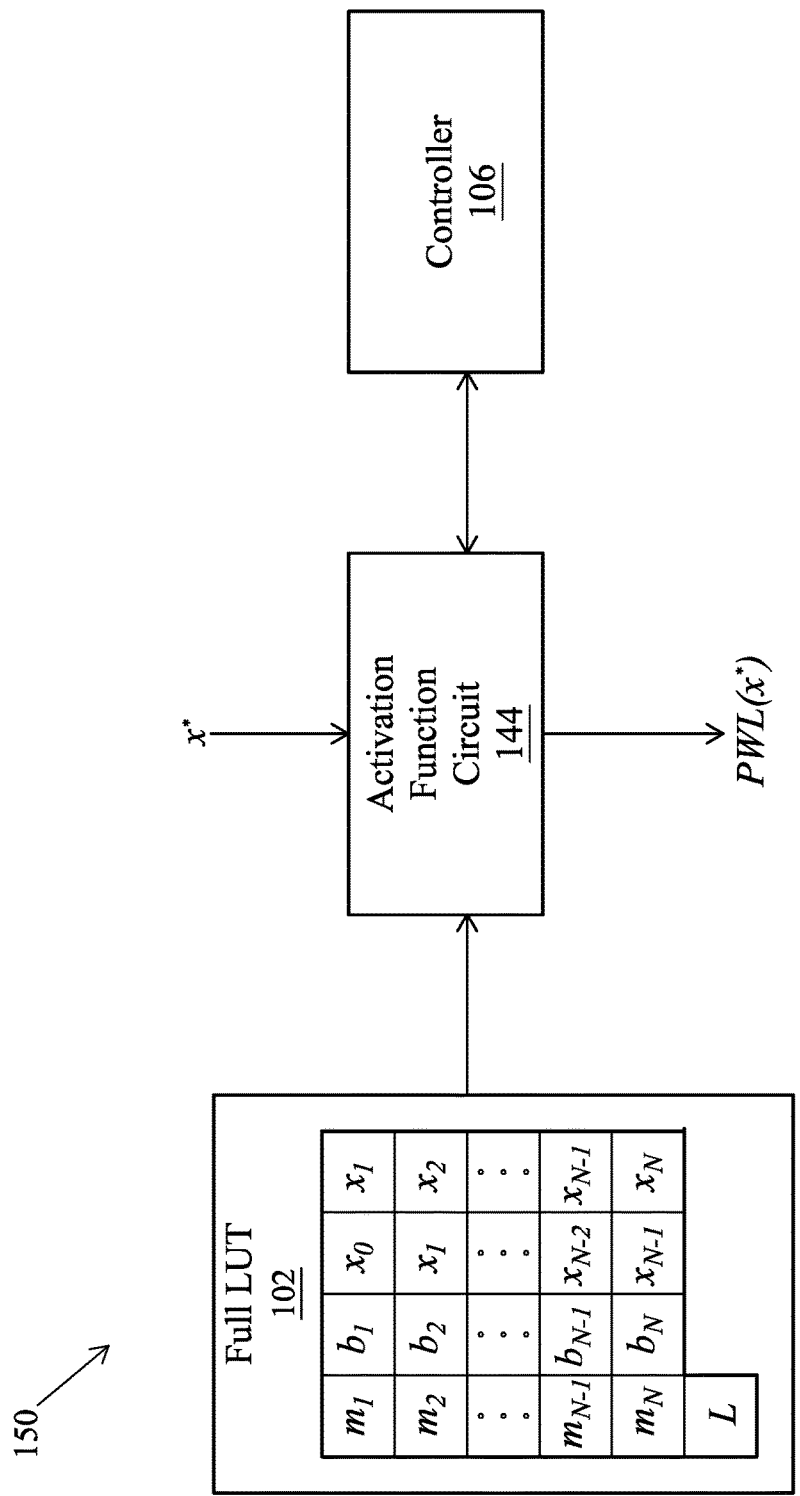
FIG. 12 depicts a system for evaluating PWL(x) at an input value x*, in accordance with one embodiment of the present invention.

System 150 described in FIG. 12 departs from the above-described systems 100, 120, 130 in that it involves the use of transform functions. A discussion of the transform functions is first provided before providing the details of system 150. One transform function is defined for each of the N linear segments of the piecewise linear function PWL(x). More specifically, if index i were used to index each of the linear segments, segment i would have a corresponding transform function $T_i(x)$.

For i=1, the transform function $T_1(x)$ may be expressed as follows:

$$T_1(x) = \begin{cases} m_1 x_0 + b_1 & \text{for} \quad x < x_0 \\ m_1 x + b_1 - L & \text{for} \quad x_0 \le x < x_1 \\ x & \text{for} \quad x \ge x_1 \end{cases}$$

For $i \in \{2, \ldots, N-1\}$, the transform function $T_i(x)$ may be expressed as follows:

$$T_i(x) = \begin{cases} x & \text{for} \quad x < x_{i-1}, x \ge x_i \\ m_i x + b_i - L & \text{for} \quad x_{i-1} \le x < x_i \end{cases}$$

For i=N, the transform function $T_i(x)$ may be expressed as follows:

$$T_N(x) = \begin{cases} x + L & \text{for} \quad x < x_{N-1} \\ m_N x + b_N & \text{for} \quad x_{N-1} \le x < x_N \\ m_N x_N + b_N & \text{for} \quad x \ge x_N \end{cases}$$

Figure 10A:
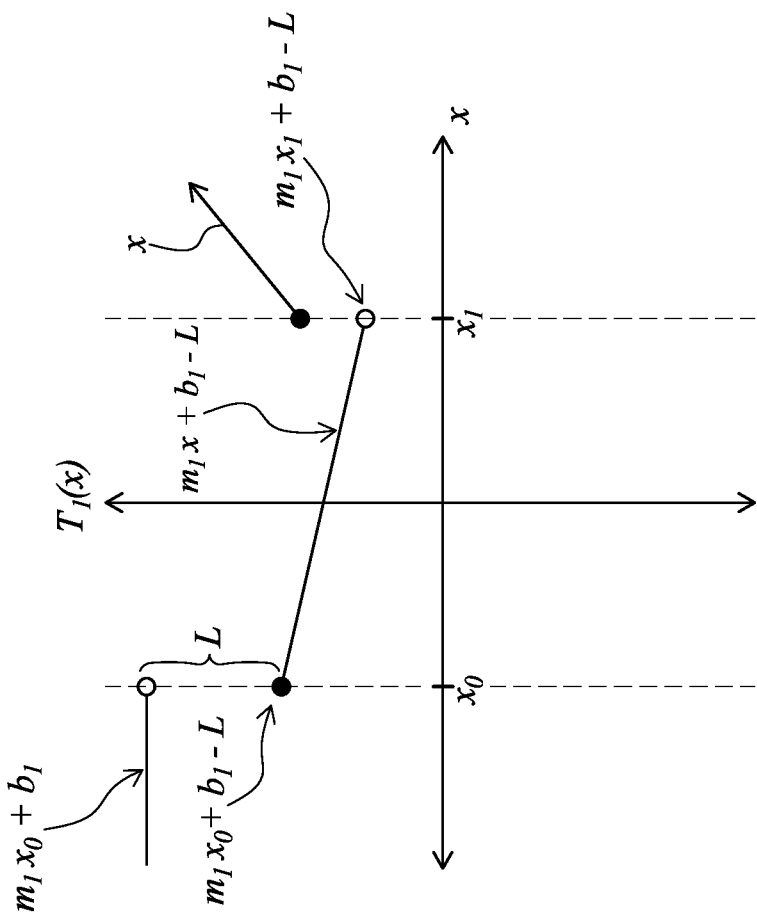
FIGS. 10A-10B depict plots of transform functions $T_i(x)$, for $1 \leq i \leq N$, in accordance with one embodiment of the present invention.
Figure 10B:
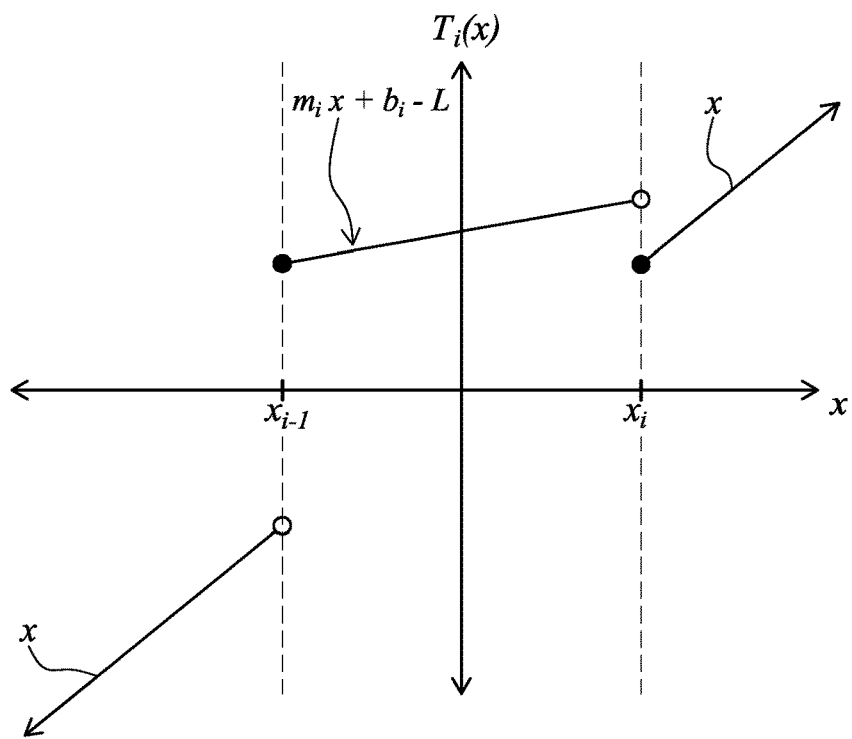
Figure 10B:
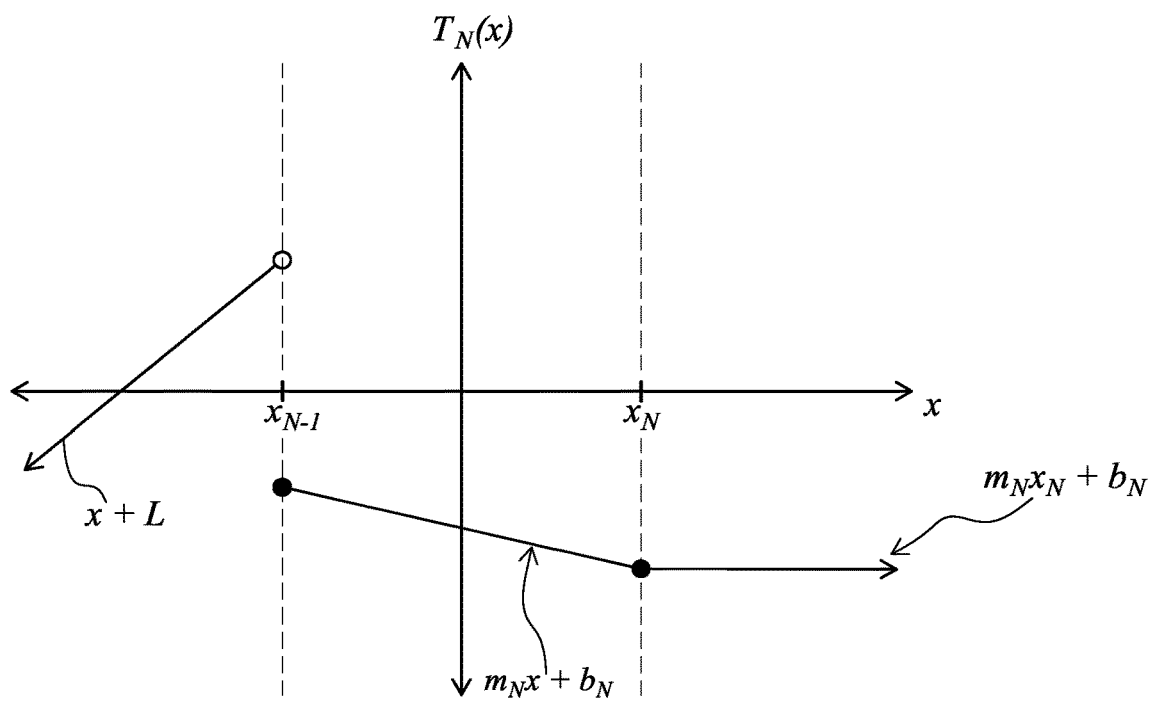
Figure 11:
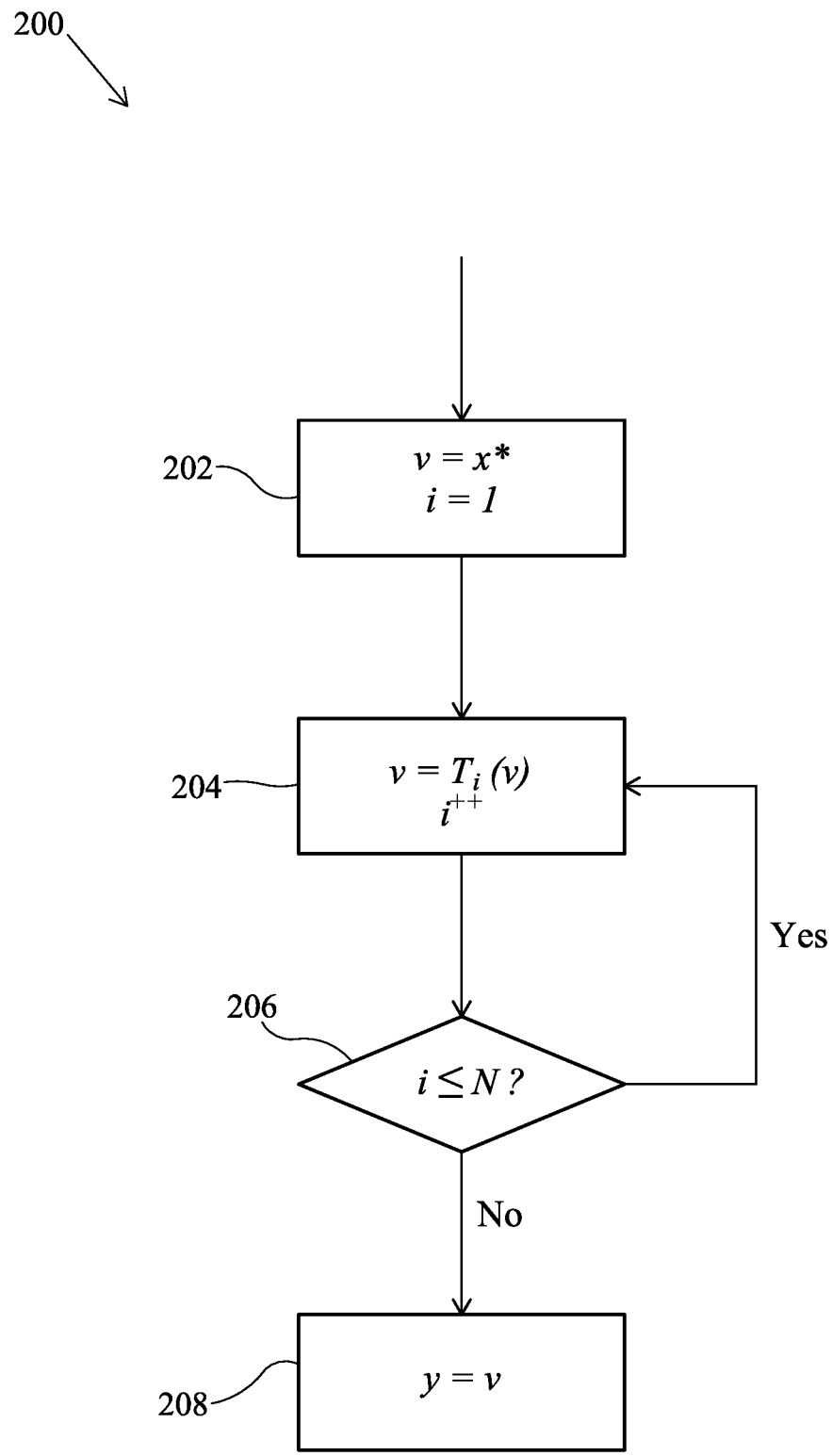
FIG. 11 depicts a flow chart of an algorithm for evaluating PWL(x) at an input value x*, in accordance with one embodiment of the present invention.

A plot of the transform functions is provided in FIGS. 10A-10B. Similar to PWL(x), the transform functions $T_i(x)$ may be parameterized by $\{x_j\}$ for $j \in \{0, \ldots, N\}$ and $\{m_i, b_i\}$ for $i \in \{1, \ldots, N\}$. However, $T_i(x)$ contains one additional parameter L which must be chosen in a particular manner in order for the algorithm to work properly.

In order explain the procedure for selecting L, a flow chart of an algorithm 200 for evaluating PWL(x) at an input value x* is first explained. At step 202, the variable v is set to x* and index i is set to 1. At step 204, the variable v is set equal to $T_i(v)$ and the index i is incremented by 1. At step 206, the algorithm determines whether the index i is less than or equal to N (i.e., the total number of linear segments of the piecewise linear function PWL(x)). If so (yes branch of step 206), the algorithm returns to step 204. If not (no branch of step 206), the output y is set equal to the variable v (step 208), which actually equals PWL(x*) as will become more apparent after the discussion below.

The main idea of algorithm 200 is that if the input value x* falls within the domain of linear segment i (i.e., for $i \in \{1, \ldots, N-1\}$), application of $T_i(x)$ in step 204 will map the input value x* to an output value using the linear function of the $i^{th}$ segment (i.e., $m_i x + b_i$). If the input value x* falls outside of the domain of segment i, application of $T_i(x)$ in step 204 will return x* (i.e., will essentially be the identity function). The complication is that step 204 is repeatedly executed, so there is a chance that the mapped input value (i.e., $m_i x^* + b_i$) will be remapped, which would lead to an incorrect value. To prevent remapping, the strategy is to subtract a large offset from the mapped input value (i.e., $m_i x^* + b_i - L$) to shift the mapped input value to a portion of the domain of the subsequent transform function $T_{i+1}(x)$ that corresponds to the identity function. During the application of the last transform function, $T_N(x)$ (which corresponds to the evaluation of the last segment), the offset is added back to the previously mapped input value to recover the mapped input value (i.e., $m_i x^* + b_i - L + L$). If, however, the input value x* falls within the domain of the last segment (i.e., segment N), the input value x* will not yet have been mapped. In this instance, the last transform function, $T_N(x)$ simply applies the linear function of the last segment to the input value (i.e., $m_N x^* + b_N$) to arrive at PWL(x*).

The bounding of L is first explained in the context of the first segment of PWL(x), and then the analysis can be extended to the remaining segments other than segment N. No bounding of L is necessary for segment N, as segment N is the last segment without any possibility for remapping. The critical observation is that if the input value x* falls within the domain of the first linear segment (i.e., $x_0 \le x < x_1$), the output of the transform function $T_1(x)$ must be less than $x_1$ to prevent that output from being remapped. If such condition were violated, there is a chance that the output of the transform function could be remapped by $T_2(x) = m_2 x + b_2 - L$ for $x \ge x_1$. Such condition may be written as follows:

$$\max_{x_0 \le x \le x_1} T_1(x) < x_1$$

Since $T_1(x)$ is a linear function for $x_0 \leq x < x_1$, its maximum must be the y-value of one of its endpoints, so the above condition is equivalent to:

$$m_1 x_0 + b_1 - L < x_1 \text{ and } m_1 x_1 + b_1 - L < x_1$$

After some algebraic manipulation, this expression simplifies to:

$$L > \max\{m_1 x_0 + b_1 - x_1, m_1 x_1 + b_1 - x_1\}$$

Hence, the bound on L has been provided for the first segment of PWL(x). Such analysis can be extended to segments 1 ... N−1 as follows. Recasting the above critical observation, if the input value x* falls within the domain of the $i^{th}$ linear segment (i.e., $x_{i-1} \leq x < x_i$), the output of the transform function $T_i(x)$ must be less than $x_i$ to prevent that output from being remapped. Such condition may be written as follows:

$$\max_{x_{i-1} \leq x < x_i} T_1(x) < x_1, \text{ for } i \in \{1 \ldots N-1\}$$

Since $T_i(x)$ is a linear function for $x_{i-1} \leq x < x_i$, its maximum must be the y-value of one of its endpoints, so the above condition is equivalent to:

$$m_i x_{i-1} + b_i - L < x_i \text{ and } m_i x_i + b_i - L < x_i, \text{ for } i \in \{1 \ldots N-1\}$$

After some algebraic manipulation, this expression simplifies to:

$$L > \max \{m_i x_{i-1} + b_i - x_i, m_i x_i + b_i - x_i\}, \text{ for } i \in \{1 \ldots N-1\}$$

Which further simplifies to:

$$L > \max_{i \in \{1 \ldots N-1\}} \{m_i x_{i-1} + b_i - x_i, m_i x_i + b_i - x_i\}$$

Hence, the bound on L has been provided for PWL(x). Pseudo-code is included in the Appendix for computing the expression:

$$\max_{i \in \{1 \ldots N-1\}} \{m_i x_{i-1} + b_i - x_i, m_i x_i + b_i - x_i\}$$

Once the bound has been calculated, L may be determined as the bound +ε, where ε is a small positive value, such as the smallest representable positive value. For the corner case where the input value x* is less than $x_0$, a choice was made to set PWL(x*)=$m_1 x_0 + b_1$, as reflected in the construction of $T_1(x)$. For the corner case where the input value x*>$x_N$, a choice was made to set PWL(x*)=$m_N x_N + b_N$, as reflected in the construction of $T_N(X)$.

FIG. 12 depicts a system 150 for evaluating PWL(x) at an input value x* in accordance with algorithm 200. The components of system 150 are similar to the components of system 120, except for the activation function circuit 144. The full LUT 102 of system 150 also stores the constant L in contrast to the earlier discussed full LUTs. Again, for ease of depiction, full LUT 102 is depicted as being directly coupled to the activation function circuit 144. However, it should be understood that in a more complete depiction, full LUT 102 may be coupled to the activation function circuit 144 via controller 106. The details of one embodiment of activation function circuit 144 are provided in FIGS. 13A-13C below.

Figure 13A:
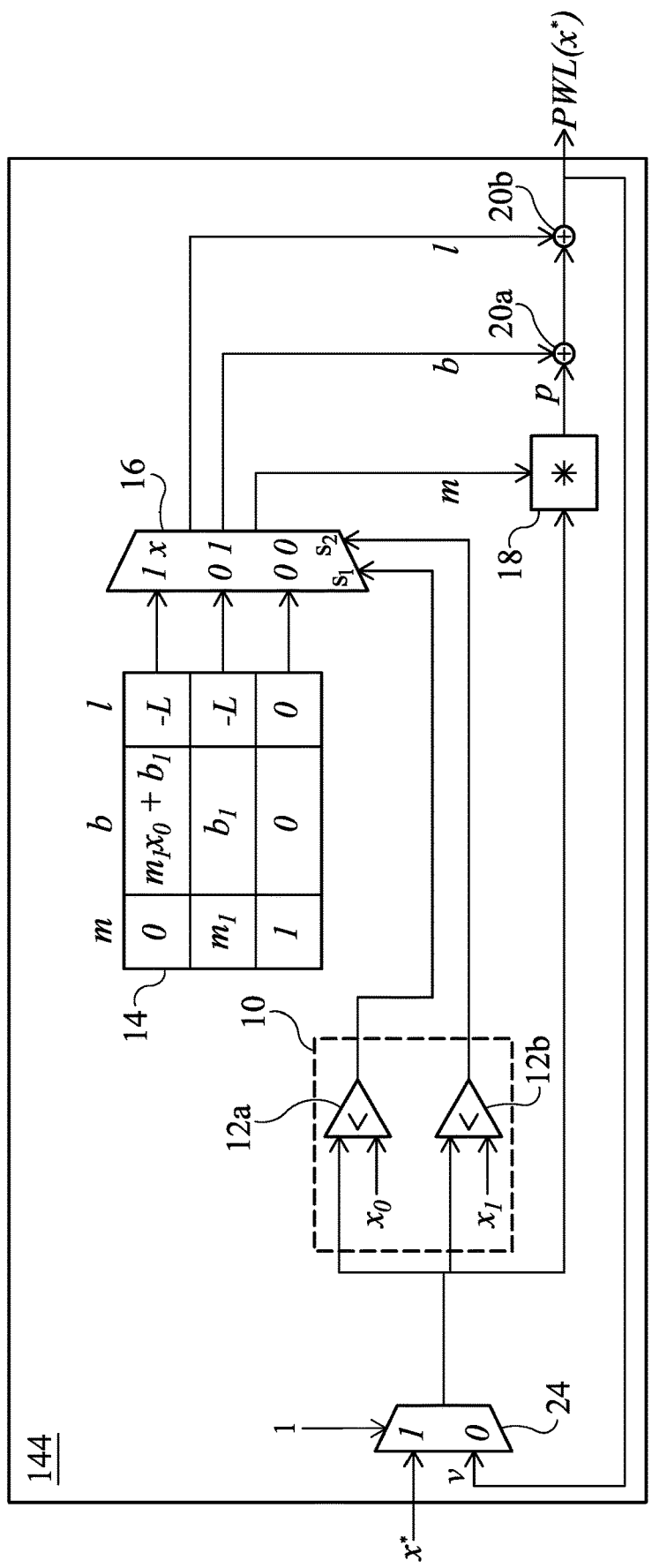
FIGS. 13A-13C depict a logic level schematic of a conceptual implementation of the activation function circuit depicted in FIG. 12, and the state of the activation function circuit during various iterations of an algorithm for evaluating PWL(x) at an input value x*, in accordance with one embodiment of the present invention.

FIG. 13A depicts a logic level schematic of a conceptual implementation of the activation function circuit 144 depicted in FIG. 12, and the state of the activation function circuit 144 during the first iteration of algorithm 200 for evaluating PWL(x) at an input value x*. At the outset of the first iteration, certain parameters are loaded from the full LUT 102 into the activation function circuit 144. These parameters include $x_o$ which is provided to one of the inputs of the comparator 12a and $x_1$ which is provided to one of the inputs of the comparator 12b. These parameters also include $m_1$, $b_1$, $x_0$ and L which may be transformed by a combinatorial circuit (not depicted) or controller 106 before the values [0, $m_1 x_0 + b_1$, −L] are stored in the first row of the partial LUT 14, the values [$m_1$, $b_1$, −L] are stored in the second row of the partial LUT 14, and the values [1, 0, 0] are stored in the third row of the partial LUT 14. The operation of the activation function circuit 144 may proceed as follows.

The input value x* is received by multiplexor 24. Conceptually, multiplexor 24 passes the input value x* if the index i equals 1 and passes a feedback value, v (i.e., the output of adder 20b), if the index i∈{2 ... N}. In the first iteration depicted in FIG. 13A, index i equals 1, so the selector input to the multiplexor 24 is set to 1 in order to pass the input value x*. It is noted that the particular choice of values for the selector input of the multiplexor 24 is provided as an example only. Accordingly, it is possible that the selector input value of 0 could be designated to pass the input value x* and the selector input value of 1 could be designated to pass the input value v.

The classifier 10 may receive the input value x* and classify the input value x* in one of three segments of a number line. The classifier 10 may be implemented using two comparators 12a, 12b. Comparator 12a may determine whether the input value x* is less than $x_0$, and comparator 12b may determine whether the input value x* is less than The respective outputs of the comparators 12a, 12b may be used as selector signals of a multiplexor 16. Specifically, the output of comparators 12a and 12b may be connected to selectors $s_1$ and $s_2$, respectively. Selector $s_1$ receiving logical 1 causes the multiplexor 16 to output the first row of the partial LUT 14; selector $s_2$ receiving logical 1 causes the multiplexor 16 to output the second row of the partial LUT 14; and selectors $s_1$ and $s_2$ both receiving logical 0 causes the multiplexor 16 to output the third row of the partial LUT 14.

The multiplier 18 may be configured to multiply the input value x* with a slope value, m, retrieved from the partial LUT 14 to form a product, p. The adder 20a is configured to sum the product, p, with an intercept value, b, retrieved from the partial LUT 14. The adder 20b is configured to sum the output of adder 20a with the offset value, 1, received from the partial LUT 14 to generate the feedback value, v. Based on the above discussion, it should be apparent that the evaluation of step 204, specifically v=$T_1$(x*), is carried out in FIG. 13A.

Figure 13B:
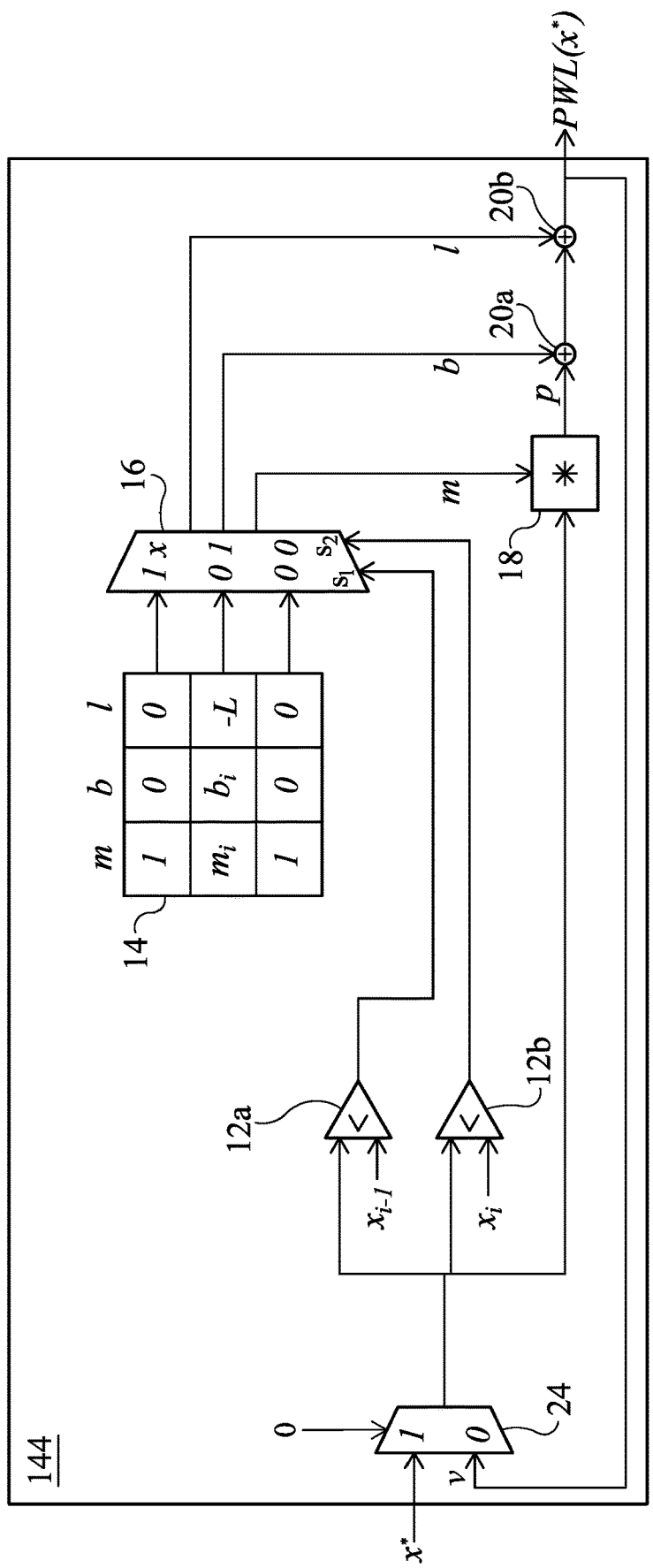

FIG. 13B depicts the state of the activation function circuit 144 during the intermediate iterations of algorithm 200 for index i∈{2 ... N−1}. At the outset of any of the intermediate iterations, certain parameters are loaded from the full LUT 102 into the activation function circuit 144. These parameters include $x_{i-1}$ which is provided to one of the inputs of the comparator 12a and $x_i$ which is provided to one of the inputs of the comparator 12b. These parameters also include $m_i$, $b_i$ and −L which may be loaded into the partial LUT 14. More specifically, through the control of the controller 106, the values [1, 0, 0] may be stored in the first row of the partial LUT 14, the values [$m_i$, $b_i$, −L] may be stored in the second row of the partial LUT 14, and the values [1, 0, 0] may be stored in the third row of the partial LUT 14. The operation of the activation function circuit 144 may proceed as follows.

Multiplexor 24 passes the input value x* if the index i equals 1 and passes a feedback value, v (i.e., the output of adder 20b), if the index i∈{2 . . . N}. In any of the intermediate iterations depicted in FIG. 13B, index i∈ {2 . . . N−1}, so the selector input to the multiplexor 24 is set to 0 in order to pass the feedback value, v.

The classifier 10 may receive the feedback value, v, and classify the feedback value, v, in one of three segments of a number line. The classifier 10 may be implemented using two comparators 12a, 12b. Comparator 12a may determine whether the feedback value, v, is less than $x_{i-1}$, and comparator 12b may determine whether the feedback value, v, is less than $x_i$.

The respective outputs of the comparators 12a, 12b may be used as selector signals of a multiplexor 16. Specifically, the output of comparators 12a and 12b may be connected to selectors $s_1$ and $s_2$, respectively. Selector $s_1$ receiving logical 1 causes the multiplexor 16 to output the first row of the partial LUT 14; selector $s_2$ receiving logical 1 causes the multiplexor 16 to output the second row of the partial LUT 14; and selectors $s_1$ and $s_2$ both receiving logical 0 causes the multiplexor 16 to output the third row of the partial LUT 14.

The multiplier 18 may be configured to multiply the feedback value, v, with a slope value, m, retrieved from the partial LUT 14 to form a product, p. The adder 20a is configured to sum the product, p, with an intercept value, b, retrieved from the partial LUT 14. The adder 20b is configured to sum the output of adder 20a with the offset value, 1, received from the partial LUT 14 to generate the feedback value, v. Based on the above discussion, it should be apparent that the evaluation of step 204, specifically $v=T_i(v)$ for i∈{2 . . . N−1} is carried out in FIG. 13B.

Figure 13C:
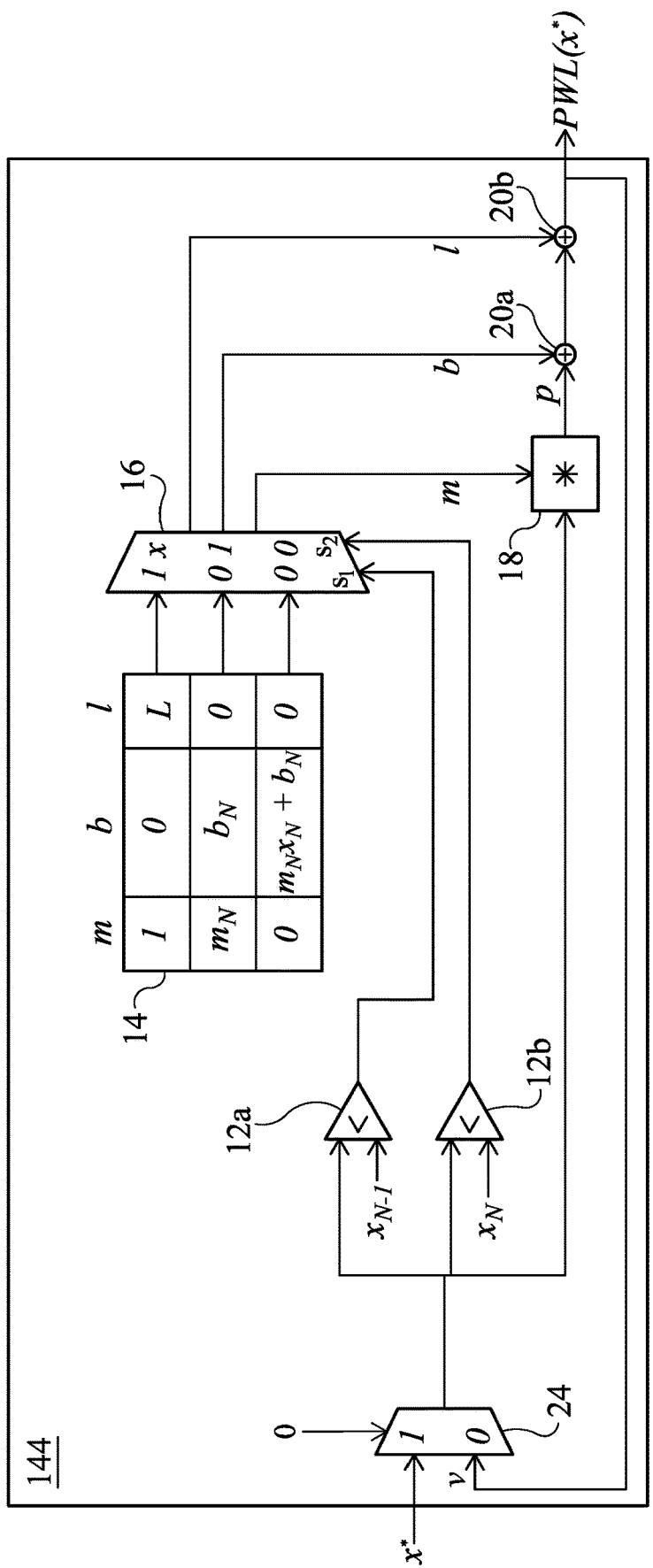

FIG. 13C depicts the state of the activation function circuit 144 during the final iteration of algorithm 200 for index i=N. At the outset of the final iteration, certain parameters are loaded from the full LUT 102 into the activation function circuit 144. These parameters include $x_{N-1}$ which is provided to one of the inputs of the comparator 12a, and $x_N$ which is provided to one of the inputs of the comparator 12b. These parameters also include $m_N$, $b_N$, $x_N$ and L which may be transformed by a combinatorial circuit (not depicted) or controller 106 before the values [1, 0, L] are stored in the first row of the partial LUT 14, the values [$m_N$, $b_N$, 0] are stored in the second row of the partial LUT 14, and the values [0, $m_N x_N + b_N$, 0] are stored in the third row of the partial LUT 14. The operation of the activation function circuit 144 may proceed as follows.

Multiplexor 24 passes the input value x* if the index i equals 1 and passes a feedback value, v (i.e., the output of adder 20b), if the index i∈{2 . . . N}. In the final iteration depicted in FIG. 13c, index i=N, so the selector input of the multiplexor 24 is set to 0 in order to pass the feedback value, v.

The classifier 10 may receive the feedback value, v, and classify the feedback value, v, in one of three segments of a number line. The classifier 10 may be implemented using two comparators 12a, 12b. Comparator 12a may determine whether the feedback value, v, is less than $x_{N-1}$, and comparator 12b may determine whether the feedback value, v, is less than $x_N$.

The respective outputs of the comparators 12a, 12b may be used as selector signals of a multiplexor 16. Specifically, the output of comparators 12a and 12b may be connected to selectors $s_1$ and $s_2$, respectively. Selector $s_1$ receiving logical 1 causes the multiplexor 16 to output the first row of the partial LUT 14; selector $s_2$ receiving logical 1 causes the multiplexor 16 to output the second row of the partial LUT 14; and selectors $s_1$ and $s_2$ both receiving logical 0 causes the multiplexor 16 to output the third row of the partial LUT 14.

The multiplier 18 may be configured to multiply the feedback value, v, with a slope value, m, retrieved from the partial LUT 14 to form a product, p. The adder 20a is configured to sum the product, p, with an intercept value, b, retrieved from the partial LUT 14. The adder 20b is configured to sum the output of adder 20a with the offset value, 1, received from the partial LUT 14 to generate PWL(x*). Based on the above discussion, it should be apparent that the evaluation of step 204, specifically $v=T_N(v)$ is carried out in FIG. 13C.

Figure 14A:
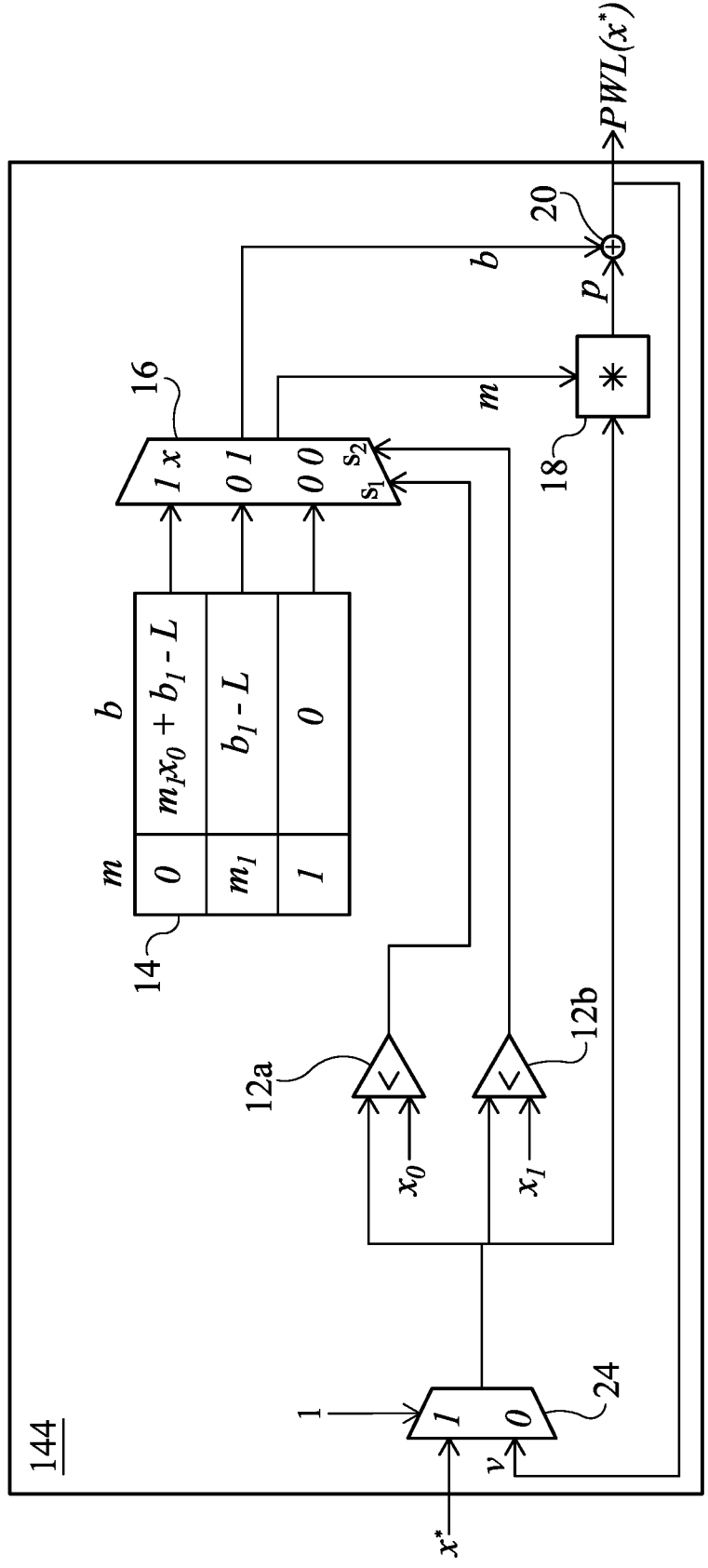
FIGS. 14A-14C depict a logic level schematic of a more efficient implementation of the activation function circuit depicted in FIG. 12, and the state of the activation function circuit during various iterations of an algorithm for evaluating PWL(x) at an input value x*, in accordance with one embodiment of the present invention.
Figure 14B:
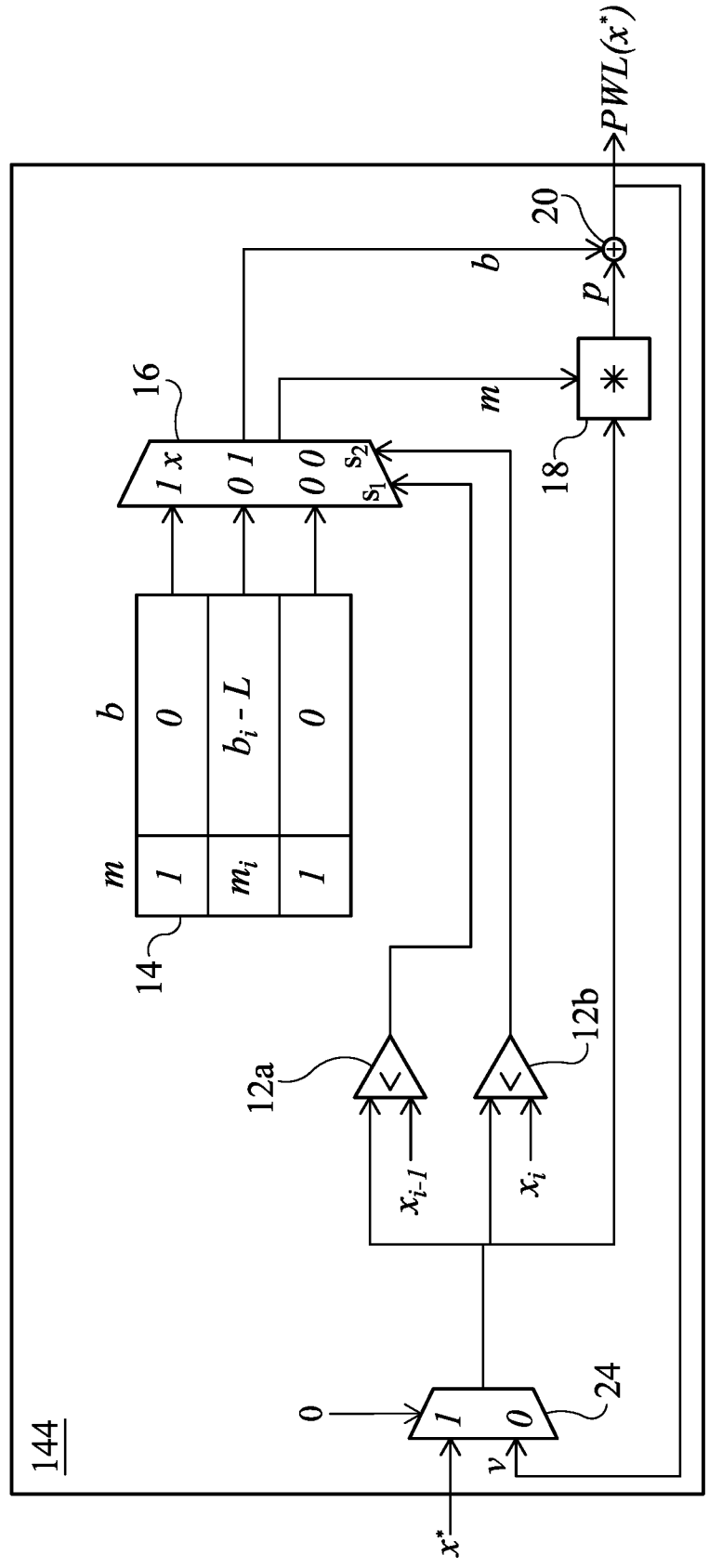
Figure 14C:
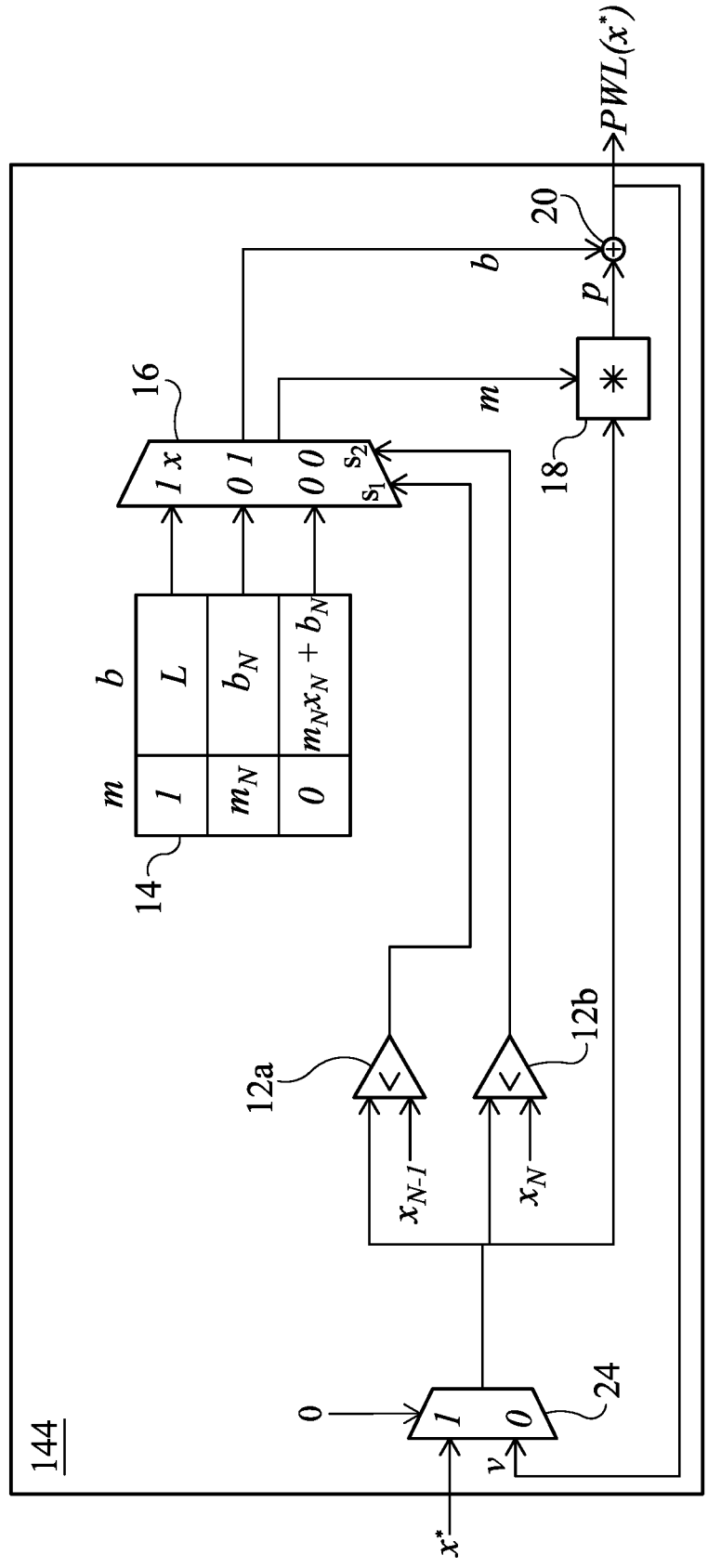

FIGS. 14A-14C depict a logic level schematic of a more efficient implementation of the activation function circuit 144 depicted in FIG. 12, and the state of the activation function circuit 144 during various iterations of an algorithm for evaluating PWL(x) at an input value x*. The implementation of FIGS. 14A-14C differs from that of FIGS. 14A-14C by summing (i.e., across each row) intercepts and offset values of the partial LUT 14, to form new intercept values. With such change, only a single adder 20 is needed to sum the intercept value, b, with the product, p. As all other aspects of the FIGS. 14A-14C are identical to FIGS. 13A-13C, the description of FIGS. 14A-14C will not be provided in further detail.

It is noted that the above-described extension in FIGS. 5A-5C can be applied to the embodiments of FIGS. 13A-13C and 14A-14C. In that extension, the classifier 10 was implemented with a greater number of comparators, allowing the classifier 10 to classify the input value x* to a greater number of segments per iteration. It should be apparent that the classifier 10 of activation function circuit 144 could also be implemented with a greater number of comparators, allowing the classifier 10 to classify the input value x* or feedback value v to a greater number of segments per iteration. In such case, the partial LUT 14 would also need to be modified to include additional rows to store the parameters of the additional segments classified per iteration. Accordingly, in other embodiments, the partial LUT 14 may include three or more rows (or entries).

It is further noted that the minimum number of rows (or entries) of the partial LUT 14 in the embodiment of FIGS. 13A-13C and 14A-14C was three, corresponding to the minimum number of segments present in each of the transform functions. Again, for the activation function circuit to provide hardware savings, the number of rows of the partial LUT 14 must be less than the number of rows of the full LUT 102. Therefore, it follows that in the embodiments of interest, the full LUT 102 should have four or more rows (or entries) (i.e., at least one more row than the partial LUT 14).

Figure 15:
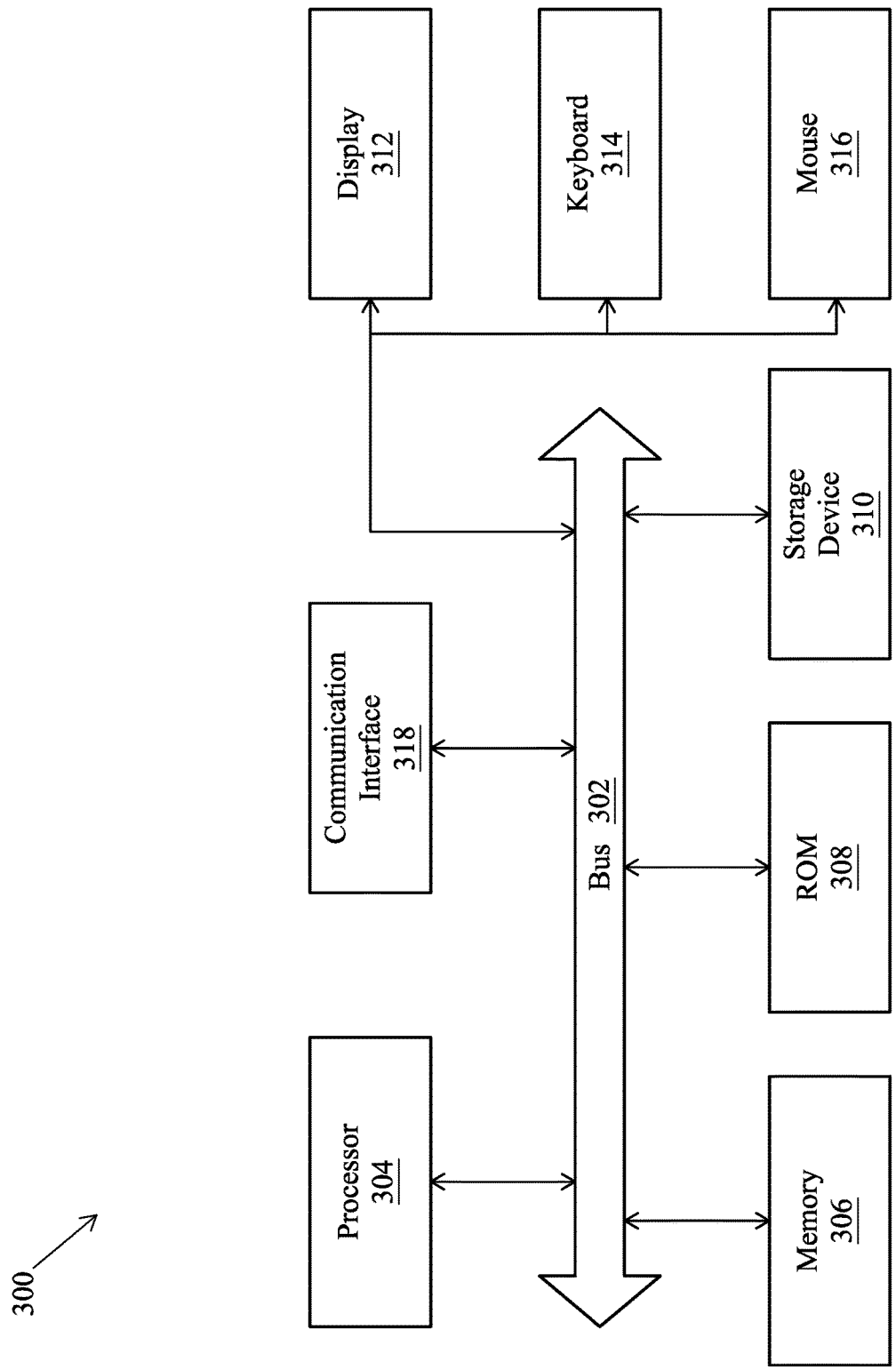
FIG. 15 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 15 provides an example of a system 300 that may be representative of any of the computing systems (e.g., controller 106) discussed herein. Examples of system 300 may include a microcontroller, an embedded system, etc. Note, not all of the various computer systems have all of the features of system 300. For example, certain ones of the computer systems discussed above may not include a display inasmuch as the display function may be provided by a client computer communicatively coupled to the computer system or a display function may be unnecessary. Such details are not critical to the present invention.

System 300 includes a bus 302 or other communication mechanism for communicating information, and a processor 304 coupled with the bus 302 for processing information. Computer system 300 also includes a main memory 306, such as a random access memory (RAM) or other dynamic storage device, coupled to the bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to the bus 302 for storing static information and instructions for the processor 304. A storage device 310, for example a hard disk, flash memory-based storage medium, or other storage medium from which processor 304 can read, is provided and coupled to the bus 302 for storing information and instructions (e.g., operating systems, applications programs and the like).

Computer system 300 may be coupled via the bus 302 to a display 312, such as a flat panel display, for displaying information to a computer user. An input device 314, such as a keyboard including alphanumeric and other keys, may be coupled to the bus 302 for communicating information and command selections to the processor 304. Another type of user input device is cursor control device 316, such as a mouse, a trackpad, or similar input device for communicating direction information and command selections to processor 304 and for controlling cursor movement on the display 312. Other user interface devices, such as microphones, speakers, etc. are not shown in detail but may be involved with the receipt of user input and/or presentation of output.

The processes referred to herein may be implemented by processor 304 executing appropriate sequences of computer-readable instructions contained in main memory 306. Such instructions may be read into main memory 306 from another computer-readable medium, such as storage device 310, and execution of the sequences of instructions contained in the main memory 306 causes the processor 304 to perform the associated actions. In alternative embodiments, hard-wired circuitry or firmware-controlled processing units may be used in place of or in combination with processor 304 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 300 or similar electronic computing device, that manipulates and transforms data represented as physical (electronic) quantities within its registers and memories into other data similarly represented as physical quantities within its memories or registers or other such information storage, transmission or display devices.

Computer system 300 also includes a communication interface 318 coupled to the bus 302. Communication interface 318 may provide a two-way data communication channel with a computer network, which provides connectivity to and among the various computer systems discussed above. For example, communication interface 318 may be a local area network (LAN) card to provide a data communication connection to a compatible LAN, which itself is communicatively coupled to the Internet through one or more Internet service provider networks. The precise details of such communication paths are not critical to the present invention. What is important is that computer system 300 can send and receive messages and data through the communication interface 318 and in that way communicate with hosts accessible via the Internet. It is noted that the components of system 300 may be located in a single device or located in a plurality of physically and/or geographically distributed devices.

Thus, systems for evaluating a piecewise linear function have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

APPENDIX x_vect[0, ..., N−1]=[$x_0$, ..., $x_{N-1}$];
m_vect[1, ..., N−1]=[$m_1$, ..., $m_{N-1}$];
b_vect[1, ..., N−1]=[$b_1$, ..., $b_{N-1}$];
bound=large negative value;
for (i=1; i<=N−1; i++) {
   bound=max(bound, m_vect[i]*x_vect[i−1]+b_vect[i]−x_vect[i]);
   bound=max(bound, m_vect[i]*x_vect[i]+b_vect[i]−x_vect[i]);
}

What is claimed is:

1. A system, comprising:
a first look-up table (LUT) with N entries, wherein each of the N entries contains parameters that define a corresponding linear segment;
a second LUT with M entries, wherein M is less than N;
a controller configured to store a subset of the N entries from the first LUT in the second LUT;
a classifier configured to receive an input value and classify the input value in one of a plurality of segments of a number line, wherein a total number of the segments is equal to M, and wherein the segments are non-overlapping and contiguous; and
a multiplexor for selecting one of the M entries of the second LUT based on the classification of the input value into one of the plurality of segments.

2. The system of claim 1, wherein the controller is further configured to successively update the second LUT to store non-overlapping subsets of the N entries from the first LUT.

3. The system of claim 1, wherein each of the N entries of the first LUT stores a slope and an intercept value.

4. The system of claim 1, wherein each of the N entries of the first LUT is associated with a range of input values.

5. The system of claim 1, wherein at a first moment in time during a computation of a piecewise linear approximation of a non-linear function applied to the input value, at least one entry of the second LUT stores a non-zero slope value and a non-zero intercept value.

6. The system of claim 5, wherein at the first moment in time, at least one entry of the second LUT stores a zero slope value and a zero intercept value.

7. The system of claim 6, wherein at a second moment in time during the computation of the piecewise linear approximation of the non-linear function applied to the input value, at least two of the M entries of the second LUT store a zero slope value and a zero intercept value.

8. The system of claim 1, further comprising an adder and a multiplier, wherein the multiplier is configured to multiply the input value with a slope value retrieved from the second LUT to form a product, and wherein the adder is configured to sum the product with an intercept value retrieved from the second LUT to form a sum.

9. The system of claim 8, further comprising an accumulator configured to accumulate the sum computed by the adder with a running total.

10. The system of claim 1, wherein the classifier comprises a plurality of comparators.

11. The system of claim 1, further comprising a memory element, wherein each of the M entries of the second LUT includes a value for either enabling or disabling a storing operation associated with the memory element.

12. A system, comprising:
 a first look-up table (LUT) with N entries, wherein N is greater than or equal to four and each of the N entries contains parameters that define a corresponding linear segment;
 a second LUT with M entries, wherein M is less than N and is greater than or equal to three;
 a controller configured to store values in the second LUT that are based on a subset of the N entries from the first LUT;
 a classifier configured to receive an intermediate value and classify the intermediate value in one of a plurality of segments of a number line, wherein a total number of the segments is equal to M, and wherein the segments are non-overlapping and contiguous; and
 a first multiplexor for selecting one of the M entries of the second LUT based on the classification of the intermediate value into one of the plurality of segments.

13. The system of claim 12, wherein the controller is further configured to successively update the second LUT to store values based on one or more of the N entries from the first LUT.

14. The system of claim 12, wherein each of the N entries of the first LUT stores a slope and an intercept value.

15. The system of claim 12, wherein each of the N entries of the first LUT is associated with a range of input values.

16. The system of claim 12, wherein at a first moment in time during a computation of a piecewise linear approximation of a non-linear function applied to an input value, at least one of the M entries of the second LUT stores a slope value equal to one.

17. The system of claim 12, further comprising an adder and a multiplier, wherein the multiplier is configured to multiply the intermediate value with a slope value retrieved from the second LUT to form a product, and wherein the adder is configured to sum the product with a value retrieved from the second LUT to arrive at a feedback value.

18. The system of claim 17, further comprising a second multiplexor for selecting either an input value or the feedback value as the intermediate value.

19. The system of claim 12, wherein the classifier comprises a plurality of comparators.

* * * * *